US009352339B2

(12) United States Patent
Buisson et al.

(10) Patent No.: US 9,352,339 B2
(45) Date of Patent: May 31, 2016

(54) METHOD AND PULVERISATION HEAD, ASSOCIATED METHOD AND APPARATUS TO MANUFACTURE A PRODUCT IN POWDER FORM

(75) Inventors: Pierre Buisson, Lagord (FR); Alain Grizeau, La Rochelle (FR); Fabrice Richard, Bessines (FR); Jean-Marc Chicheportiche, Paris (FR); Jean Pierre Renaudeaux, Chevreuse (FR); Jean-Baptiste Zainoun, Saint Remy Les-chevreuse (FR)

(73) Assignee: SPRAINNOV, La Rochelle (FR)

( * ) Notice: Subject to any disclaimer, the term of this patent is extended or adjusted under 35 U.S.C. 154(b) by 1256 days.

(21) Appl. No.: 12/934,731

(22) PCT Filed: Mar. 25, 2009

(86) PCT No.: PCT/FR2009/050510
§ 371 (c)(1),
(2), (4) Date: Jan. 27, 2011

(87) PCT Pub. No.: WO2009/125129
PCT Pub. Date: Oct. 15, 2009

(65) Prior Publication Data

US 2011/0114745 A1 May 19, 2011

(30) Foreign Application Priority Data

Mar. 25, 2008 (FR) ..................................... 08 01608

(51) Int. Cl.

*B05B 3/10* (2006.01)
*B01J 2/04* (2006.01)
*B01J 2/18* (2006.01)
*B01J 13/00* (2006.01)
*B01J 13/02* (2006.01)
*B05B 3/00* (2006.01)
*B05B 3/02* (2006.01)
*B05B 17/06* (2006.01)
*B05B 7/04* (2006.01)
*B05B 7/14* (2006.01)

(52) U.S. Cl.

CPC ................ *B05B 3/1014* (2013.01); *B01J 2/04* (2013.01); *B01J 2/18* (2013.01); *B01J 13/0095* (2013.01);

(Continued)

(58) Field of Classification Search
CPC .......... B05B 3/001; B05B 3/02; B05B 3/025; B05B 3/10; B05B 3/1007; B05B 3/1014; B05B 3/1057; B05B 3/1064; B05B 7/02; B05B 7/04; B05B 7/0408; B05B 7/14; B05B 7/1481; B05B 7/149; B05B 17/04; B05B 17/06; B05B 17/0607; B01J 2/02; B01J 2/04; B01J 2/18; B01J 13/0095; B01J 13/02

USPC ............. 239/4, 7, 102.1, 102.2, 214.25, 215, 239/222, 223, 224

See application file for complete search history.

(56) References Cited

U.S. PATENT DOCUMENTS 4,619,400 A * 10/1986 van der Burgt ........... 239/102.1

FOREIGN PATENT DOCUMENTS

EP 0446134 9/1991
GB 909474 10/1962

(Continued)

OTHER PUBLICATIONS

Zainoun, N. et al., "Controle Dimensionnel des Aerosols par Piezoelectricite" [Online], URL:http://www.spraysas.com/mecanotransduction, 2004, XP002505890, cited in ISR.

(Continued)

*Primary Examiner* — Christopher Kim

(74) *Attorney, Agent, or Firm* — Young & Thompson

(57) ABSTRACT

A pulverization head of an apparatus includes a motor whose vertical hollow shaft is integrally linked, at its lower end, to a centrifugal ejection disc. The substance to be pulverized, coming from a tank via a proportioning pump, crosses the hollow shaft to be spread in a thin layer on the lower surface of the disc forming the centrifugal ejection face. Elements are designed to vibrate the peripheral edge of the disc and control the pulverization of the substance. A fan and a distributor produce a treatment gas flow which meets and draws droplets towards a collection zone, solidifying them by drying or freezing. Typically, the substance is a mixture of at least one active ingredient and a microencapsulation constituent. For use to obtain very fine and/or very homogeneous particle size, to manufacture powders for food processing, nutritional, cosmetic, pharmaceutical and fine chemical applications. The head is useful to produce aerosols.

37 Claims, 13 Drawing Sheets

(52) U.S. Cl.
CPC ............ *B01J 13/02* (2013.01); *B05B 3/001* (2013.01); *B05B 3/025* (2013.01); *B05B 3/1057* (2013.01); *B05B 3/1064* (2013.01); *B05B 17/0607* (2013.01); *B05B 7/0408* (2013.01); *B05B 7/149* (2013.01)

(56) References Cited

FOREIGN PATENT DOCUMENTS

| | | |
|---|---|---|
| JP | 05184994 | 7/1993 |
| JP | 2003001147 | 1/2003 |
| WO | 2005102537 | 11/2005 |

OTHER PUBLICATIONS

Zainoun, N. et al., "The Vibrating Spinning Disk", [Online], URL:http://www.spraysas.com, Dec. 8, 2004, XP002505891, English abstract included, cited in ISR.

Zainoun, N. et al., "Controle Dimensionnel des Aerosols par Piezoelectricite", XXIXEME Congres De La Societe De Biomecanique, [Online], URL:http://www.spraysas.com, Sep. 10, 2004, XP002505892, cited in ISR.

Zainoun, N. et al., "Fluids and Applications" [Online], URL:http://www.spraysas.com, Nov. 27, 2008, XP002505893, cited in ISR.

International Search Report dated Oct. 22, 2009 from PCT/FR2009/050510.

* cited by examiner

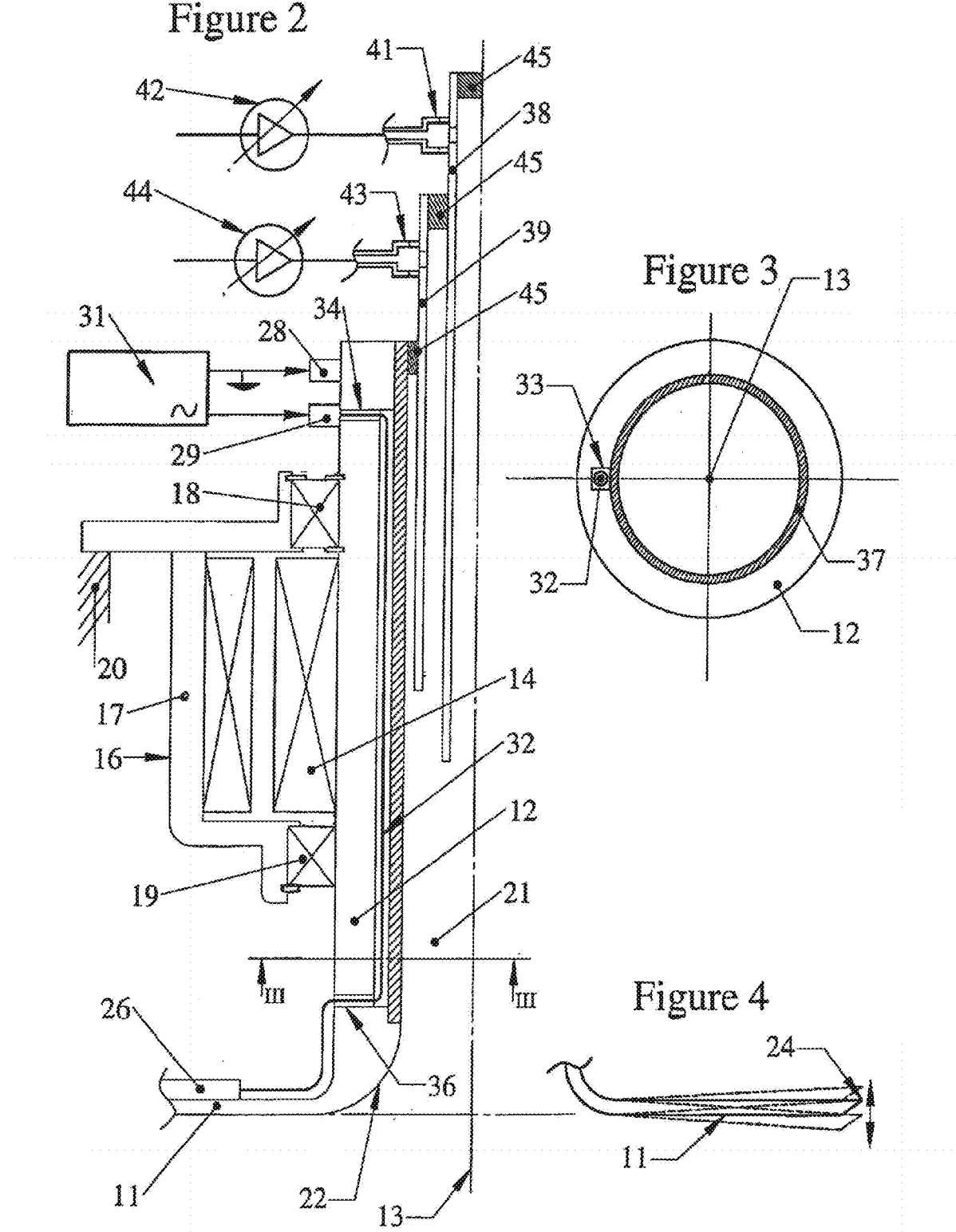

METHOD AND PULVERISATION HEAD, ASSOCIATED METHOD AND APPARATUS TO MANUFACTURE A PRODUCT IN POWDER FORM

This invention relates to a method of pulverisation or atomisation with centrifugal ejection of a substance including at least a liquid component, placed on a rotary body driven at a suitable speed of revolutions. In the continuation, the words "pulverisation" and "atomisation" are used as synonyms to indicate the formation of a fog of droplets.

The aerosol obtained with such a method can be directly useful, for example in the applications of paint, pulverisation of manure or other substances used in agriculture, pulverisation in the atmosphere for example to treat the ambient air against insects, bad smells, germs etc.

In other applications, the aerosol is intended to undergo a subsequent treatment of drying ("spray-drying"), or of solidifying ("spray-cooling" or "prilling"), in particular for microencapsulation purposes. A solid pulverulent product is obtained, which can be a finished product, or on the contrary an intermediate average product intended to undergo at least a later treatment or transformation.

Thus, the present invention relates moreover to a broader method including a pulverisation operation associated with an operation for the treatment of aerosol with a gas flow to obtain a product in powder form.

The present invention also relates to a pulverisation head or atomisation for the implementation of one or the other method.

This present invention also relates to processing apparatus using a pulverisation head and associating with it means to apply a treatment for the aerosol particles.

The invention relates in particular to monodisperse aerosols or powders. One thus names the aerosols or the powders of which substantially all particles (droplets or respectively grains) have substantially the same dimension (the same diameter if one accepts that the particles are spherical) that one wishes to be able to choose. The invention also relates to the aerosols or the powders with polydispersity known as controlled or mastered. One thus names the aerosols or the powders of which substantially all particles have a dimension (diameter) pertaining to a relatively narrow range. The invention also relates to pluridisperse aerosols or powder, i.e. of which almost all particles have one or the other regardless of predetermined dimensions (diameters), or belong to one or the other of any narrow ranges of predetermined sizes (diameters).

One knows of preparation methods of a composition capable of drying or solidifying (composition intended to be put in solid form) for the production of monodisperse powders or with controlled polydispersity for agro-alimentary, nutritional, cosmetic, pharmaceutical applications and fine chemicals, implementing the production of drops for obtaining monodisperse solid products or with controlled polydispersity.

One knows of preparation methods of a drying or solidifying composition and production of micro-encapsulated powders for agro-alimentary, nutritional, cosmetic, pharmaceutical applications and fine chemicals.

The microencapsulation methods are mainly of two types:

Integration method: the active ingredient to be encapsulated and the encapsulation matrix are integrated in mass by homogeneous mixture thus offering a partial microencapsulation because of the presence on the surface of non encapsulated active ingredient molecules.

Film forming microencapsulation method: the active ingredient is completely coated with a film forming matrix.

The co-drying method consists in co-pulverizing in an atomisation tower one or more liquids, while injecting at the same time a powder flow likely to be used as support and/or diluent with the liquid product to dry.

For the production of aerosols, the EP 0 446 134 B1 teaches to deposit a liquid in the center of rotation of an ejection surface extending to an edge of peripheral ejection. The ejection surface and in particular the ejection edge have a symmetry of revolution around the rotation center. By the centrifugal effect, the substance forms on the surface of ejection a liquid layer which slides towards the edge of ejection. When it arrives at the edge of the disc, the layer can split into ligaments regularly distributed on the periphery. In their turn, the ligaments split in droplets. The document also teaches that such an aerosol can be made monodisperse by applying to the liquid a vibratory stimulus. The more the frequency is raised, the more the droplets obtained are fine. Other parameters also condition the diameter of the droplets, in particular the viscosity of the liquid, its temperature, its flow, the diameter and the number of revolutions of the ejection surface, the nature and the surface quality of the ejection face, the configuration of the ejection edge, etc.

Pulverisation by centrifugal ejection on a rotary body makes it possible to carry out high flows with relatively simple means without being exposed to the risks of blocking presented by other techniques such as the nozzles.

However, the means of vibratory stimulus employed according to the above mentioned document are perfectible in terms of cost, and/or effectiveness, and/or range of realizable frequencies.

The WO 2005/102 537 teaches to insert a vibrator between the rotary body and its drive motor in order to assign to the rotary body the vibration thanks to which the generated aerosol is monodisperse.

Taking into account the mass to undergo vibration, and relatively low sympathetic vibration frequency of the vibrating part, the vibratory energy to be provided is relatively important and the practically achievable maximum frequency relatively weak. This device does not make it possible to obtain the smallest sizes of droplets that may be requested in practice.

According to these two documents, the surface of ejection is turned in the essentially opposite direction to the rotary drive motor. The substance to be pulverized arrives on the surface of ejection by the opposite side to the motor. This establishment is penalizing in certain installations because it requires fluidic, electrical and/or mechanical connections on both sides of the plane of formation of the aerosol.

The WO 2006/131 629 describes an autonomous pulverisation device with revolving disc. In certain versions intended to float on a water level, the drive shaft is hollow and is used as ascending supply pipe axially crossing the motor and the rotary body to exit by an opening to the surface of the rotary body directed in a basically opposite direction to the motor.

The known pulverisation heads do not make it possible to obtain droplets or particles comprising several components, such as for example mixtures, structured or not, or structured particles, for example encapsulated, etc Another limitation of the methods and known pulverisation heads relates to the flow of liquid which they are able to pulverize. There exists a need, in particular industrial, to produce higher flows with pulverisation heads by centrifugation.

There also exists a need to prepare agro-alimentary, nutritional, cosmetic, pharmaceutical compositions and fine chemicals, personalized by their monodisperse character or with controlled polydispersity whose diameter can be selected between 20 and 2000 μm, and in particular micro-encapsulated, and this, in a reliable and relatively simple way to facilitate the use of the products being used to prepare these compositions, to improve their stability in time, to mask undesirable tastes, to confer properties to them with delayed effect, or of controlled bioavailability.

There exists a need to improve the production methods of preparation of agro-alimentary, nutritional, cosmetic, pharmaceutical compositions and fine chemicals.

The aim of this invention is to provide solutions to all or part of the problems thus posed in comparison with the state of the art and in particular to widen the field of application of pulverisation or atomisation by rotary body.

According to the first aspect of the invention, the method for generating an aerosol from at least one substance, in which:
  one places in rotation a rotary body having at least one surface of ejection, finished by a peripheral ejection edge,
  one brings the substance on the surface of ejection during the rotation of the rotary body, and
  one maintains a vibration in the rotary body,
is characterized in that the vibration causes oscillation to the area of the edge of ejection compared to a central area of the rotary body.

Such a vibration is much less energy consuming than the techniques known previously because the mass to be vibrated is weaker. Moreover, the vibration according to the invention corresponds to a distortion of the rotary body. The elastic coefficient characterizing this distortion can be very high. The conjunction of a low vibratory mass and a high elastic coefficient corresponds to a definitely increased sympathetic vibration frequency. Vibration frequencies of about 100 Khz, or even higher, become achievable. It is in particular advantageous to apply a frequency of stimulus close to the sympathetic vibration frequency associated with the mode of distortion which is activated by the stimulus. The structure according to the invention thus makes it possible to obtain a monodisperse aerosol with a very small size of droplets, for example 0.02 mm.

According to another characteristic of the invention, one carries out thanks to a pulverisation head to rotary body a composite aerosol by feeding the head with several components. These components can be substances which one separately deposits in the center of respective surfaces of ejection. Surfaces of ejection can have a common peripheral edge. The substances can then mix when they cross the common edge of ejection, then form droplets containing a mixture, homogeneous or not, of these substances. At least two surfaces of ejection can also each have their own peripheral edge, so that each surface of ejection forms its own droplets. If one applies a vibratory frequency to support a predetermined size of the droplets, this size can be different, or on the contrary equal, for the two substances. It is also possible to mix the components before depositing them in the center of a common surface of ejection, or at the time to deposit them in the center of a common surface of ejection. One of the components can be a powder and the other a liquid. The particles of the powder roll on the surface of ejection by covering itself with the liquid component, then are ejected in the form of coated particles intended either to preserve their heterogeneity, in particular for the manufacture of micro-encapsulated particles, or to evolve to a different form, for example by dissolution of the solid particle in the liquid which coats it, or by chemical reaction between the two components.

The invention also considers pulverisation heads equipped with at least two surfaces of ejection, for example the two opposite faces of the same rotary body or of the faces of several rotary bodies. One can feed the at least two surfaces of ejection with a same substance to double or multiply the production of aerosol. One can also feed various surfaces of ejection with different substances, solid, liquid or gas to increase the possibilities as regards combinations of substances. In particular, it is envisaged to be able to feed each surface of ejection independently from the others, and to be able to regulate the flow and granulometry of aerosol associated with each surface independently with those associated with other surfaces. One can also configure surfaces of ejection and/or the edges of ejection differently each from each other. For example, a surface of ejection can be smooth, another grooved, an edge of ejection can be continuous, another notched.

The invention also aims the manufacture of powders by forming an aerosol by centrifugal ejection of one or more substances on one or more rotary surfaces of ejection, and nearly simultaneous treatment of this aerosol by a gas flow which meets the zone of formation of the aerosol. The gas flow can be a flow of air, for example to dry the droplets and to thus transform them into solid pellets.

The flow of treatment can have a substantially coaxial tubular form with the rotary body of ejection, and meet the zone of formation of the aerosol all around the body of ejection.

According to another aspect of the invention, the pulverisation head includes:
  a rotary body connected to a drive motor around a rotation axis and carrying jointly at least one surface of ejection finished by a peripheral edge of ejection,
  routing means of at least one substance to the at least one surface of ejection,
  stimulus means to generate a vibration of the surface of ejection,
is characterized in that the stimulus means are conceived to do to vibrate the edge of ejection by vibratory distortion of the rotary body.

According to a characteristic of the invention, in a pulverisation head functioning by centrifugal ejection of at least one substance on a surface of rotary ejection, the routing means are at least partly arranged inside a hollow shaft of the rotary body starting from a drive motor. The routing means can channel separately in the hollow shaft, preferably by concentric conduits, at least two distinct substances or components which one can then make a mix in the hollow shaft or on the contrary that one can lead each one separately to respective faces of ejection. A surface of final ejection, turned in the opposite direction to the motor, can be crossed by an opening of the central routing through which emerges the interior space of the hollow shaft or a conduit lodged within it. A surface of ejection turned towards the motor and/or lodged between two rotary bodies following one another axially, can be associated to openings of routing installed through the wall of the hollow shaft or associated with at least one routing path formed around the motor and emerging through an annular slit opposite to the junction of the surface of ejection with the hollow shaft. This aspect of the invention makes it possible to lodge the driver motor between the rotary bodies on the one hand and the source(s) of substance on the other hand. One thus avoids the need for connections coming through the side of the rotary body opposite the motor. The pulverisation head can then form a monobloc compact unit relatively easy to install in its industrial environment.

Preferably, the drive means, routing means, and stimulus means are entirely located on the same side compared to the surface of ejection.

According to another aspect of the invention, the apparatus for producing a pulverulent substance is characterized in that it includes an enclosure, at least one pulverisation head according to the invention, assembled in the enclosure, of the means to generate a gas flow of treatment which meets the zone of formation of the aerosol in the enclosure, and at least one opening of collection of the processed substance and used process gas.

There can be a pulverisation head, for example in central position, or several heads, for example three pulverisation heads laid out in triangle.

This invention relates in particular to the agro-alimentary, nutritional, cosmetic, pharmaceutical compositions and of fine chemicals, and more particularly those obtained by the circulation of a product or several products, of which at least one of the products is liquid, within one or several enclosures and dispersed via a vibrated turning disc, in the form of monodisperse drops or with polydispersity controlled in a heated gas fluid that circulates to the contact of these drops and allowing through drying by drive, the production of monodisperse solid particles or with controlled polydispersity, and in particular micro-encapsulated ones. These particles can be simple or composite. At the time of the drying operations, it is possible that the surface of the dry particles presents craters inducing a more or less significant porosity influencing directly the properties of wettability and instantaneity of solubilization of the monodisperse particles or with controlled polydispersity.

This invention also relates to the agro-alimentary, nutritional, cosmetic, pharmaceutical compositions and of fine chemicals, and more particularly those obtained by the production, using at least one vibrating rotary body (such as disc), of liquid and/or solid particles, monodisperse or with controlled polydispersity, of which at least one of the components is liquid, within an enclosure in the form of drops in a gas fluid whose temperature is selected lower than the melting point, for the freezing and production of monodisperse solid particles or with controlled polydispersity, whose diameter can in particular be selected between 20 and 2000 μm and in particular able to be micro-encapsulated. These particles can be simple or composite.

Another form of the invention includes an initial implementation of one or the other of the methods described above to put in the form of monodisperse spheres or spheres with controlled polydispersity one or more active ingredients having initially a nonspherical heterogeneous form and a polydisperse granulometry, then a second implementation of one or the other of the methods described above to micro-encapsulate these spheres.

Another form of the invention relates to the microencapsulation of solids divided on a nanometric scale which one integrates in a lipidic matrix with high melting point to produce monodisperse particles or with controlled polydispersity of which one can choose the diameter between 20 and 2000 μm.

As an example, this invention relates to the monodisperse compositions containing one or several thermosensitive active ingredients such as pro-biotics, presenting characters of revivability directly according to a residence time at a temperature included between 30° C. and 90° C. However the thermosensitive character of such compositions limits the choice of the fat contents at high melting point being appropriate for their microencapsulation. The mixture of pro-biotics with the molten fat contents should not be exposed for a too long time at a lethal temperature. In a surprising way it was noted that the method described above makes it possible to reduce the time of contact of a pro-biotic medium with the molten fat contents at values ranging between 10 to 1000 milliseconds (preferably between 15 and 100 milliseconds), and to obtain, starting from musts of fermentation presenting initial concentrations in pro-biotics ranging between $10^5$ and $10^{12}$, monodisperse dry compositions or with controlled polydispersity, whose diameter can be selected between 20 and 2000 μm, pro-biotics starting from pure phylum or mixtures of phylums presenting rates of revivability ranging between approximately $10^4$ to $10^5$ and approximately $10^{11}$ to $10^{12}$, which thus corresponds to lower losses to a log. Each particle presents uniform characteristics allowing the division of a batch in many homogeneous sub-batches and with the same characteristics as the "master" batch, and remarkable flow properties.

Very homogeneous calibration and granulometry being able to be very fine make it possible to reduce considerably the soak time of the sensitive substances to heat while guaranteeing, better than previously, physicochemical and biological qualities of the product obtained.

As another example, this invention relates to the pulverulent compositions based on one or several essential oils presenting a monodisperse character or with controlled polydispersity, whose diameter can be selected between 20 and 2000 μm, micro-encapsulated according to the method of the invention by concomitant injection of a matrix containing fat contents at high melting point, without contact between the essential oils and the molten fat contents make modifications or distortions through an over-long exposure to a too high temperature of the lightest volatile fractions of the essential oil or of the mixture of essential oils. The monodisperse character or with controlled polydispersity of the products obtained makes it possible to control penetration or distribution rates; thus in the cosmetic field, the use of such preparations of essential monodisperse oils brings additional guarantees against the risks of crossing the epithelial barrier for applications known as medicine of improvement; one thus mainly eliminates the problems arising from the nanoparticles in the field of cosmetics and the result of these ultra fine particles able to cross aleatory the dermic barrier with risk of penetration in underlying vital tissue. (See "Nano derm research project" financed by the European Commission). In a surprising way, the structure of the solid particles obtained appears as perfectly spherical spheres, whose average D diameter can be generally between 20 and 2000 μm, with a span ranging between 0.12 and 0.25 (the meaning of the word "span" will be specified further).

As another example, this invention relates to compositions containing one or several enzymes having a monodisperse granulometry or granulometry with controlled polydispersity whose diameter can be selected between 20 and 2000 μm and from which the enzymatic function must be protected either by a mass microencapsulation or/and by a film forming matrix; as a specific example, the SOD, enzyme with an antioxidant function, papain etc. . . . .

These enzymes or mixtures of enzymes may also be used in human or animal feed or within the framework of integrated methods. They present, thanks to the invention, rates of resistance to the compression which are homogeneous from one particle to another. After passing in compressing presses for the production of pellets intended for animal feeds one observes a rate of distortion of the enzymatic activity largely lower than than one observes for products obtained by uncontrolled polydisperse granulometry.

As other examples this invention relates to the compositions of extracts of plants or pharmaceutical active ingredients with monodisperse granulometry or granulometry with controlled polydispersity, presenting characters of reinforced or preserved bioavailability, and as such by the control of the selection of monodisperse granulometry or granulometry with controlled polydispersity or the mix of several monodisperse granulometry or granulometry with controlled polydispersity of which the diameter (s) may be selected between 20 and 2000 µm.

As another example, this invention relates to the compositions of pre-biotics of a monodisperse nature or controlled polydispersity nature whose granulometry is selected to optimize the kinetics of fermentation. As an example the production of a powder of monodisperse lactulose stable and instantaneously dispersible makes it possible to obtain homogeneous pre-biotic effects in the production of yoghurts with added monodisperse lactulose powder or lactulose powder with controlled polydispersity whose diameter can be selected between 20 and 2000 µm.

As another example, this invention relates to the compositions of powders of monodisperse vitamins or vitamins with controlled polydispersity and in particular of liposoluble vitamins (examples: riboflavin, Vitamin E, Vitamin D3): less distortion of the vitamin activity at the time of the "prilling" operations (solidification by freezing).

As other examples, this invention relates to the compositions based on flavanoids, sterols, phytosterols, carotenoids, poly-unsaturated fatty acids (examples: asthaxanthine, hesperidin, Ω3, Ω6).

As another example, this invention relates to compositions presenting one or more active ingredients included in a lipidic compound with high melting point, with an additional effect of "visual marker with active effect". Such compositions are typically intended to be maintained in suspension in shampoos, lotions and creams.

According to another example, this invention relates to the compositions of mineral substances in the form of liquids or suspensions (slurry) such as ceramics, rare earths, talc, monodisperse or with controlled polydispersity making it possible to optimize the properties of compressibility, porosity and sintering, as well as the same properties after calcination.

As an example, this invention relates to gelling compositions containing gums (arabic gum, guar gum, alginates, carrageenans) of animal or vegetable gelatin, and polysaccharides in gelling matter.

As an example, this invention relates to the aromatic or scenting compositions with safeguarding of the lightest volatile fractions thanks to a better microencapsulation of the top flavor. This is particularly interesting for fresh natural products where the top notes are particularly fragile and volatile.

The examples mentioned above can also be combined between them for nutritional, food, cosmetic, pharmaceutical applications or fine chemicals.

The invention thus proposes, in particular, a method of preparation of a agro-alimentary, nutritional, cosmetic, pharmaceutical composition and fine chemicals, comprising the stages consisting in:
- associating at least one disc or other vibro-rotary body and a prilling (solidifying) tower;
- simultaneous delivery of two products, liquid-liquid or solid-liquid in the center of at least one vibro-rotary disc to obtain an instantaneous mixture of the two products by vortex effect and their pulverisation in aerosol.

The mixture typically takes place in a central channel of addiction with a residence time which can be modified by adjustment or choice of the length of the central channel; at output of channel the mixture rolls on itself on the vibrating disc with an uninterrupted coating effect by the judiciously selected film forming product.

In the same way and in a surprising way, the association of a disc or another vibro-rotary body and a drying tower initially conceived and equipped to carry out drying operations by atomisation either by means of nozzles or of turbines, makes it possible to produce co-drying operations for obtaining monodisperse powders or powders with controlled polydispersity and/or for the improvement of the standard span (one will later define the concept of span). This association can if required consist in integrating a vibro-rotary disc, in particular with central channel, on an atomisation tower known as simple effect, a dual effect tower, known as with W bottom, a multiple purpose tower integrating a fluidization level at bottom of tower, and one or more vibro-fluidizers. The method consists of the original design of a vibro-rotary disc unit integrating the systems of powder injection (of granulometry multidisperse or monodisperse or with controlled polydispersity) in a fog of monodisperse drops or drops with controlled polydispersity in order to obtain particles presenting of the concentrations uniformly distributed to the scale of each monodisperse particle or particle with controlled polydispersity.

The monodisperse size or with controlled polydispersity of the particles thus obtained makes it possible to avoid the risks of heterogeneous effects related to the differential kinetics of transfer of the micro-encapsulated active ingredients, dependant on particles which are either too large and thus do not pass the requested barrier, or too small and cross too quickly or even cross higher thicknesses, for example at the level of the epithelial cells of the intestine, or even at the level of the derm for external actions.

It is thus possible, for example, to target a dimension of final monodisperse particles of 70 µm in size with a span of 0.15, guaranteeing a given threshold of penetration and/or a speed of intra-membrane transfer optimized by taking account of the required kinetics of bioavailability.

From a statistical point of view, the dispersion degree of a sampling of N particles of Di diameter is commonly characterized by a normal Gaussian distribution whose standard deviation α is described below:

The standard deviation σ of a sampling of N particles of Di diameter can be given by the following formula:

$$\sigma = \sqrt{\frac{1}{N}\sum_{i=1}^{N}(D_i - \overline{D}_{pq})^2}$$

$$= \sqrt{\frac{1}{N}\sum_{i=1}^{N}D_i^2 - 2\overline{D}_{pq}\frac{1}{N}\sum_{i=1}^{N}D_i + \overline{D}_{pq}^2}$$

$$= \sqrt{\overline{D}_{20}^2 - (2\overline{D}_{10} - \overline{D}_{pq})\overline{D}_{pq}}$$

$$\text{avec } \overline{D}_{pq} = \left(\frac{\sum_{i=1}^{N}D_i^p}{\sum_{i=1}^{N}D_i^q}\right)^{\frac{1}{p-q}} \quad \overline{D}_{10} = \left(\frac{1}{N}\sum_{i=1}^{N}D_i\right) \text{ et } \overline{D}_{20} = \sqrt{\frac{1}{N}\sum_{i=1}^{N}D_i^2}$$

$\overline{D}_{pq}$ is the average diameter in relation to which one calculates our dispersion:

$\overline{D}_{pq} = \overline{D}_{10}$ for a granulometric distribution in number, from where the standard deviation of number $\sigma_n$ can be given by the formula:

$$\sigma_n = \sqrt{\overline{D}_{20}^2 - \overline{D}_{10}^2} \quad (1)$$

$\overline{D}_{pq} = \overline{D}_{50}$ for a granulometric distribution in volume, from where the standard deviation in volume $\sigma_v$ can be given by the formula:

$$\sigma_v = \sqrt{\overline{D}_{20}^2 - (2\overline{D}_{10} - \overline{D}_{50})\overline{D}_{50}} \quad (2)$$

From a statistical point of view the dispersion degree of a sampling of N particles of $D_i$ diameter is commonly characterized by normal a Gaussian distribution whose relative standard deviation $\alpha$ is:

$$\text{In number } \alpha_n = \frac{\sigma_n}{\overline{D}_{10}} = \frac{\sqrt{\overline{D}_{20}^2 - \overline{D}_{10}^2}}{\overline{D}_{10}}$$

$$\text{In volume } \alpha_v = \frac{\sigma_v}{\overline{D}_{50}} = \frac{\sqrt{\overline{D}_{20}^2 - (2\overline{D}_{10} - \overline{D}_{50})\overline{D}_{50}}}{\overline{D}_{50}}$$

According to the invention, an aerosol is considered monodispersed if the particles that constitute it confirm the inequality:

$$\alpha \leq 0.2$$

The measurement by Laser provides a Span:

$$\text{Span} = \frac{(D_{90} - D_{10})}{D_{50}} \approx \frac{2.5\sigma_v}{D_{50}}$$

$$\text{Span} \approx 2.5\alpha_v$$

The expression "monodisperse particles" indicates, according to the invention, particles whose average size presents a standard deflection coefficient of a Gaussian distribution $0.05 \leq \alpha \leq 0.1$ equivalent to a Span: $0.25 \leq \text{Span} \leq 1$.

The expression "particles with controlled polydispersity" indicates, according to the invention, particles whose average size presents a standard deflection coefficient of a Gaussian distribution $0.1 \leq \alpha \leq 0.4$, equivalent to a Span: $0.25 \leq \text{Span} \leq 1$.

As described in the table below, the known apparatuses, whether they function by drying of droplets drawn into a carrier gas or cooling of droplets by a carrier gas, if they are equipped with traditional devices of pulverisation with nozzles, turbines disk or perforated heads, do not make it possible to obtain monodisperse particles and seldom particles with controlled polydispersity with a span lower than 1.

On the contrary, the invention allows manufacture of all these solid particles, or in the course of solidification, with or without microencapsulation, and whose span lies between 0.12 and 1.

TABLE

Field covered by invention according to on the one hand the average size of the particles, the dispersion of those, and on the other hand the method of getting solid particles by drying or solidification of droplets.

| Drive drying of droplets (atomisation or Spray drying) SD | Mono Disperse Controlled | Poly disperse Controlled Field 1/ | Poly disperse Controlled Field 2/ | Poly disperse Controlled Field 3/ | Poly disperse Non controlled Field 1/ | Poly disperse Non controlled Field 2/ | Solidification droplets of liquid By cooling (Spray cooling or Prilling) SC |
|---|---|---|---|---|---|---|---|
| Dispersion $a_v$ | 0.05 → 0.1 | 0.1 → 0.2 | 0.2 → 0.3 | 0.3 → 0.4 | 0.4.0.7 → | 0.71.2 → | |
| Mini SPAN → Maximum | 0.12 → 0.25 | 0.25 → 0.5 | 0.50 → 0.75 | 0.75 → 1 | 1 → 1.8 | 1.8 → 3 | |
| Granulometry Average D (v, o.5) in μm | | | | | | | Granulometry Average D (v, o.5) in μm |
| 20 μm | DI (SD) DI (SC) | DI (SD) DI (SC) | DI (SD) DI (SC) | DI (SD) DI (SC) | T (SD) B (SD) | B (SC) T (SC) T (SD) | 20 μm |
| 50 μm | DI (SD) DI (SC) | DI (SD) DI (SC) | DI (SD) DI (SC) | DI (SD) DI (SC) | T (SC) T (SD) | B (SC) B (SD) | 50 μm |
| 100 μm | DI (SD) DI (SC) | DI (SD) DI (SC) | DI (SD) DI (SC) | DI (SD) DI (SC) | T (SC) B (SD) | B (SC) T (SD) | 100 μm |
| 200 μm | DI (SD) DI (SC) | DI (SD) DI (SC) | DI (SD) DI (SC) | T (SC) DI (SD) DI (SC) | TP (SC) B (SD) T (SD) | TP (SC) | 200 μm |
| 500 μm | DI (SD) DI (SC) | DI (SD) DI (SC) | DI (SD) DI (SC) | TP (SC) T (SC) | B (SD) T (SD) | | 500 μm |

TABLE-continued

Field covered by invention according to on the one hand the average size of the particles, the dispersion of those, and on the other hand the method of getting solid particles by drying or solidification of droplets.

| Drive drying of droplets (atomisation or Spray drying) SD | Mono Disperse Controlled | Poly disperse Controlled Field 1/ | Poly disperse Controlled Field 2/ | Poly disperse Controlled Field 3/ | Poly disperse Non controlled Field 1/ | Poly disperse Non controlled Field 2/ | Solidification droplets of liquid By cooling (Spray cooling or Prilling) SC |
|---|---|---|---|---|---|---|---|
| 750 μm | DI (SC) | DI (SC) | TP (SC) | T (SC) | | | 750 μm |
| | DI (SC) | DI (SC) | TP (SC) | T (SC) | | | 1000 μm |
| | DI (SC) | DI (SC) | TP (SC) DI (SC) | | | | 2000 μm |

Caption:
Standard methods Nozzles B, Turbine T or vibrated or not perforated Heads (shower head) TP Specific field of the invention: DI* (Controlled Disc, vibrated or not). Foot-note: the other fields covered by other technologies are accessible by the invention, but are not indicated in this table
SD (drying of droplets, spray drying) and SC (solidification of droplets, methods known as spray-cooling or prilling)

The apparatus aim of the invention provides aerosols with a monodisperse dispersion or with controlled polydispersity.

With regard to the application in the encapsulation by solidification of droplets of liquid by cooling by a carrier gas, the variation of the parameters will concern:

Choice of the film forming matrix: pure product or mixture

Melting point of the matrix and its mixture with the active ingredient

Viscosity of the active ingredient according to concentration and temperature

Softening point according to concentration and temperature

Diameter of the vibro-rotary disc

Frequency of vibration

Nature of construction material of the vibrating disc

One determines the quantity of liquid or powder which one injects, according to at least one characteristic of the composition to obtain. This characteristic typically comprises thermo-resistance (enzymes, vitamins, thermosensitive bio-actives molecules of plant extracts), the revivability (live micro-organisms, bacteria, yeasts, moulds), the retention of the volatile molecules (essential oils, aromas, perfumes), oxidation (fat contents, oils, waxes, oleoresins), the antibiotic capacity (essential oils, antibiotics), the prevention of the formation of bad tastes by destruction or modification of the composition under the effect of the temperature (prevention of the formation of burnt flavour, reactions of Maillard), etc The invention still has as an aim, according to another of its aspects, a new apparatus resulting from the association of a system of production of monodisperse aerosols or with polydispersity controlled instead of the systems of pulverisation by nozzles or turbines traditionally equipping the atomisation towers, the spray-cooling or prilling towers or any other equipment necessary to the pulverisation of a liquid composition in a gas. This apparatus is intended for the preparation of compositions intended for agro-alimentary, nutritional, cosmetic, pharmaceutical applications and fine chemicals, including an active substance of a biochemical, chemical or mineral nature, solubilized in an aqueous or organic phase, or mixtures of these substances, of which pulverisation in a gas flow, able to be for example air, makes it possible to obtain micro-encapsulated solid particles, of a monodisperse nature or controlled polydispersity, with a span lower than 1.

According to other aspects of the invention, there exist many possible configurations making it possible to associate the system of production of monodisperse aerosols or with polydispersity controlled with an atomisation or prilling tower.

Among the major advantages of the invention, the new apparatuses aim of the invention provides performance as regards productivity (ratio of dry input matter to output matter) higher than 95%, compared to the standard materials known to the expert whose yield ranges between 85% and 95%. This surprising report was carried out by measuring the rate of fine particles (thus loss of matter) in the carrier gas. One found a rate much lower than 200 mg/Nm$^3$ of gas, whereas standard units of drying tower type by atomisation, or spray-cooling towers or prilling towers equipped normally with cyclones lead at exit of cyclones to values ranging between 200 and 400 mg/Nm$^3$ of gas.

Another benefit of the invention is the homogenization of the modes of heat transfers attached to the monodispersion of drops in a laminar gas flow during the changes of state such as evaporation or solidification with possible energy saving. The extremely homogeneous size of the droplets makes it possible to proportion with precision the thermal contribution with the just sufficient value. One thus minimizes the thermal stress of the particles while saving energy and while being certain that all the droplets are completely treated.

Taking into account the very great dimensional homogeneity of the produced particles, the invention often makes it possible to exempt complex systems such as primary and secondary cyclones in series, filters bags, air washers, etc, normally essential to separate the fine particles at exit.

In all cases, even if it proves to be necessary to install such systems for safety reasons, the invention makes it possible to reduce their size very significantly. And one minimizes in any event the loss in matter constituted of fine particles.

Other characteristics and benefits of the invention will still arise from the description hereafter, relative to nonrestrictive examples.

At the appended drawings:

FIG. 2 is a schematic axial half-section of the pulverisation head of FIG. 1;

FIG. 3 is a cut of the hollow shaft following III-III of FIG. 2;

FIG. 4 is partial cut of the rotary disc, illustrating its mode of vibratory distortion;

In the example represented in FIGS. 1 to 4, the pulverisation head includes a vibro-rotary disc 11 integrally linked to a tubular shaft 12 at one end of this shaft. Disc 11 and shaft 12 have a common axis 13 which constitutes their geometric axis as well as their axis of rotation.

Figure 1:
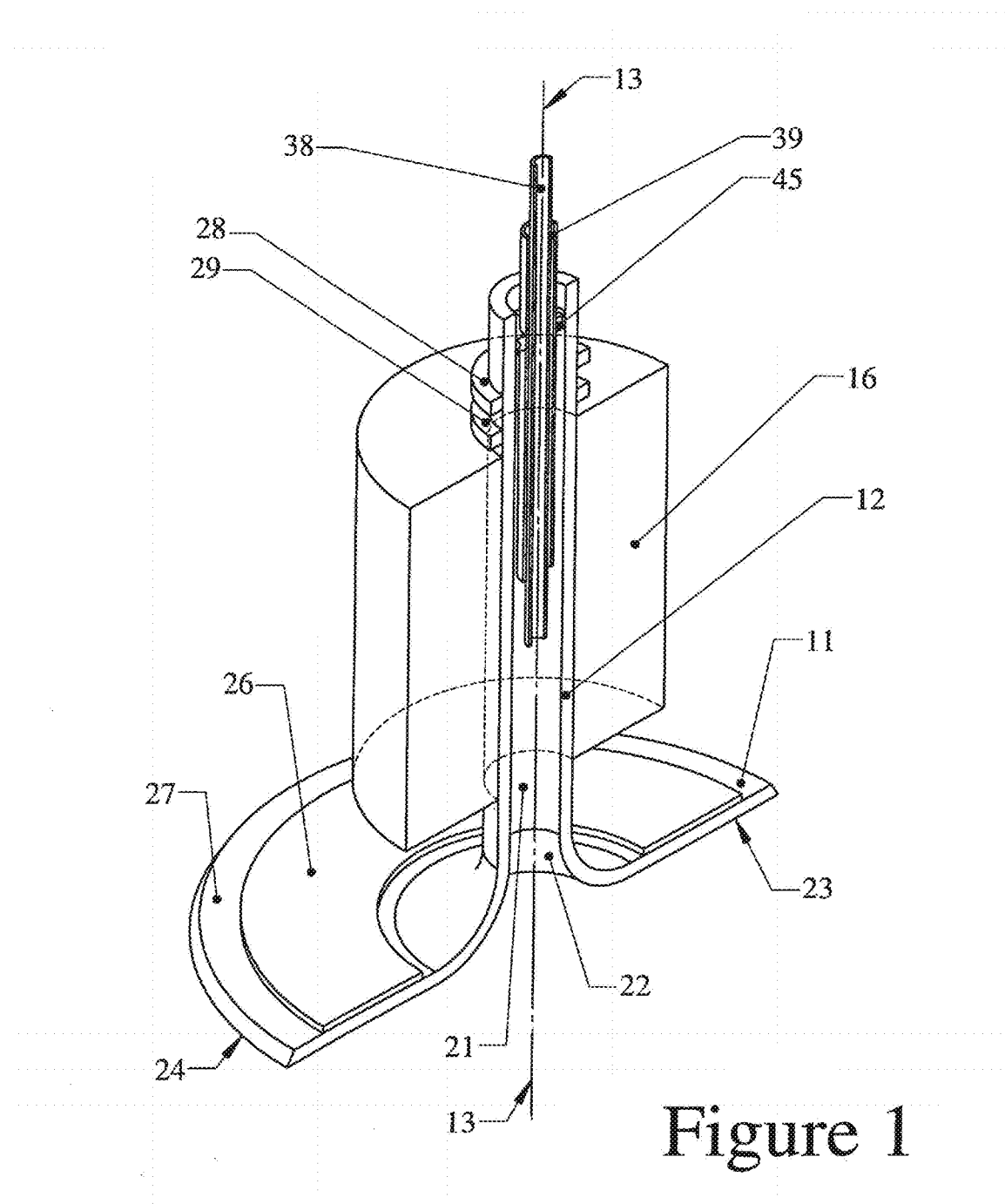
FIG. 1 is a schematic view in perspective and axial cut representing an embodiment of a pulverisation head according to the invention.

Shaft 12 is integrally linked to the rotation of the rotor 14 (FIG. 2) of an adjustable-speed electrical motor 16 intended for driving the shaft 12 and disc 11. In FIG. 1, motor 16 is represented only very schematically by one block. FIG. 2 illustrates that a casing 17 of motor 16 is integrally linked to a frame or other fixed support 20. Moreover, the tubular shaft 12 is supported in rotation in casing 17 thanks to bearings 18, 19. One of the bearings, 18, immobilises the tubular shaft 12 axially relative to casing 17 and thus relative to frame 20.

Interior space 21 of the tubular shaft 12 constitutes a delivery route for the substance to be pulverised. It emerges by an opening 22 through the face 23 of the disc 11 which is turned contrary to the motor 16. Opening 22 widens in a trumpet shape to form a transition curve between the cylindrical interior wall of shaft 12 and the planar surface 23.

The face 23 of the disc constitutes, in a manner known per se, a centrifugal ejection face for the substance to be pulverised. By centrifugal effect due to rotation of disc 11, the substance to be pulverised arriving by the opening 22 forms a thin layer on the ejection face 23. The substance is then projected radially by centrifugal effect beyond the peripheral ejection edge 24 of the ejection face 23. The edge 24 is circular, centered on axis 13. Radially beyond the edge 24, the thin layer splits typically into liquid ligaments then into droplets. The edge 24 can be smooth, as represented, or have regular notches to encourage the formation of a flow line at the end of each notch. The ejection face 11 can be smooth or grooved.

In a manner known per se, a vibration maintained in the disc 11 has the effect of producing droplets which are all substantially of the same size. According to this invention, the vibration consists of making the area of the ejection edge 24 vibrate relative to the central part of disc 11 and shaft 12. Such a mode of vibratory deformation is illustrated in FIG. 4. By bending the material, typically metal, of disc 11, the edge 24 carries out a back and forth motion along a general direction parallel with axis 13.

Such a mode of vibratory deformation typically presents a very high sympathetic vibration frequency, which may reach 100 kHz or even more. For efficiency and energy cost reasons, it is technically advantageous to maintain the vibration of the disc in the vicinity of its sympathetic vibration frequency. In addition, the frequency of vibration is a parameter which allows regulation of the gauge of the drops produced. Consequently, the head according to the invention having a very high sympathetic vibration frequency makes it possible to produce particularly small drops, with for example a diameter of 20 micrometers.

The sympathetic vibration frequency of a vibration depends in particular on the elastic stiffness of the body undergoing the vibratory deformation and on the mass moved by the vibration. It is thus possible to choose the sympathetic vibration frequency of the disc during its manufacture, and to manufacture different discs having different sympathetic vibration frequencies.

To maintain the vibration of the disc 11 under operation, piezoelectric cells 26 have been fixed to face 27 of the disc 11 which is turned towards the motor 16, i.e. the opposite face to the ejection face 23. As schematically represented in FIG. 1, the cells 26 which provide the means of vibratory stimulus are regularly distributed around axis 13.

As shown in the FIG. 2, the shaft 12 has on its outer face, on the other side of the motor 16 relative to disc 11, two revolving contacts 28, 29 which are connected to a variable-frequency inverter 31. Contact 28 is an electric earth contact, connected electrically to shaft 12 and disc 11. Contact 29, receiving the alternating signal of inverter 31, is connected to an insulated conductor 32 (see also FIG. 3) which goes from contact 29 to the piezoelectric cells 26 passing through an axial groove 33 in the interior face of shaft 12. Groove 33 emerges through the outside of shaft 12 by passages 34 and 36, making it possible for conductor 32 to be connected on the one hand to the rotating contact 29 and to the cells 26 on the other hand. The interior face of the tubular shaft 12 is sheathed by a sleeve 37 of synthetic material which completely covers throat 33 and passages 34, 36, so that conductor 32 is inserted between shaft 12 and sleeve 37.

The pulverisation head includes moreover a means of delivering the substance to be pulverised. The delivery means include the interior space 21 of shaft 12. In the example represented where the ejection face 23 is turned to the bottom while the substance to be pulverised moves downwards in the interior space 21 of shaft 12, the internal diameter of shaft 12 is chosen to be sufficiently small so that the substance, according to its viscosity, does not fall axially from the device by gravity, but remains on the contrary in capillary contact with interior surfaces of shaft 12, in particular of sleeve 37, and of the opening 22, and with the ejection face 23.

If the substance to be pulverised is made of only one constituent, or several constituents mixed beforehand, one can connect the end of shaft 12 opposite the disc 23 with the delivery tube of a proportioning pump via a revolving connection. The pump sends the substance into the interior space 21 of shaft 12, with a flow which can be regulated.

In the more sophisticated example which is represented in FIGS. 1 and 2, the interior 21 of tube 12 is used as mixing space in order to pulverise a substance made up of two constituents. Two concentric tubes 38, 39 penetrate co-axially into the interior space 21 of shaft 12 at the opposite end to disc 11. The interior of the interior tube 38 is connected by a swivel joint 41 with a proportioning pump 42 feeding one of the constituents. The annular space located between tubes 38 and 39 is connected by a swivel joint 43 with a proportioning pump 44 feeding the other constituent. Stoppers 45 prevent the constituents or the mixture from escaping from the head by the side opposite the opening 22. Tubes 38 and 39 rotate with the tubular shaft 12 of the motor 16. The two constituents can for example be, respectively, an active ingredient and an encapsulation compound.

The two tubes 38, 39 emerge in the interior space 21 of the hollow shaft 12 at a certain distance below this side of the opening 22, so that, along this distance, the interior space 21 constitutes a mixing zone for the two constituents. The mixing action is reinforced by the rotation of shaft 12 and the two tubes. Preferably, the axial position of the two tubes is adjustable by telescopic sliding motion in the shaft. This makes allows regulation of the length of the mixing zone.

One of the two constituents can be a powder. In a first typical version, the powder has a much finer particle size than the droplets to be produced by pulverisation. The other constituent is then typically a matrix which will join together in each droplet a large number of powder particles. In another typical version, the particle size of the powder is close to that of the aerosol to be produced. For example, the powder is made up of monodisperse or controlled polydisperse spherical balls, manufactured in advance by means of a first use of the invention, constituting a pulverisation followed by solidification by drying or freezing. In this case of a coarser powder, the mixture arriving on the ejection surface forms a thin layer of liquid constituent in which the powder particles roll before being ejected to form the aerosol droplets, each of which comprising a powder grain coated with the liquid component. The liquid component for example is intended to form an encapsulating film around the powder particle.

Under operation, one regulates or chooses the parameters, in particular the flow of the substance, or the respective flows of the components, their respective temperature, the diameter and the elastic stiffness of the disc, the vibration frequency, the surface quality of the disc, etc according to the nature of the components, the size of the droplets to be produced, and the quantities to be produced per unit of time.

The examples represented in FIGS. 5 to 7 will be described only for their differences compared to that of FIGS. 1 to 4.

Figure 5:
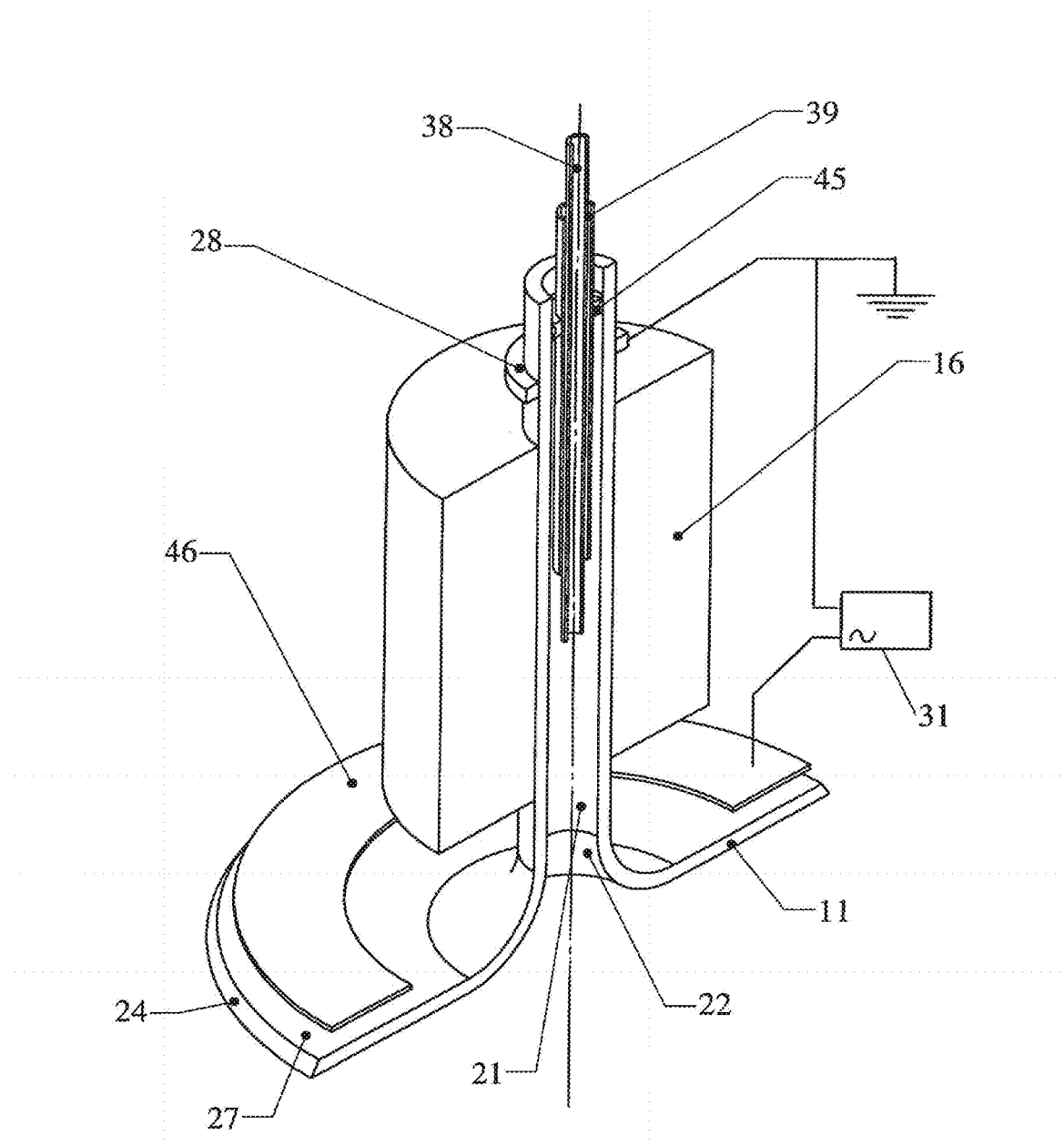
FIGS. 5 to 8 are views similar to FIG. 1, but respectively representing four other embodiments respectively of the pulverisation head according to the invention.

In the example represented in FIG. 5, the stimulus means are capacitive. Disc 11 forms a condenser with a fixed reinforcement 46 placed turned towards face 27 of disc 11. There is henceforth only one turning contact, the turning contact 28 which connects disc 11 to the earth. The fixed reinforcement 46 is connected to the signal output of inverter 31.

Figure 6:
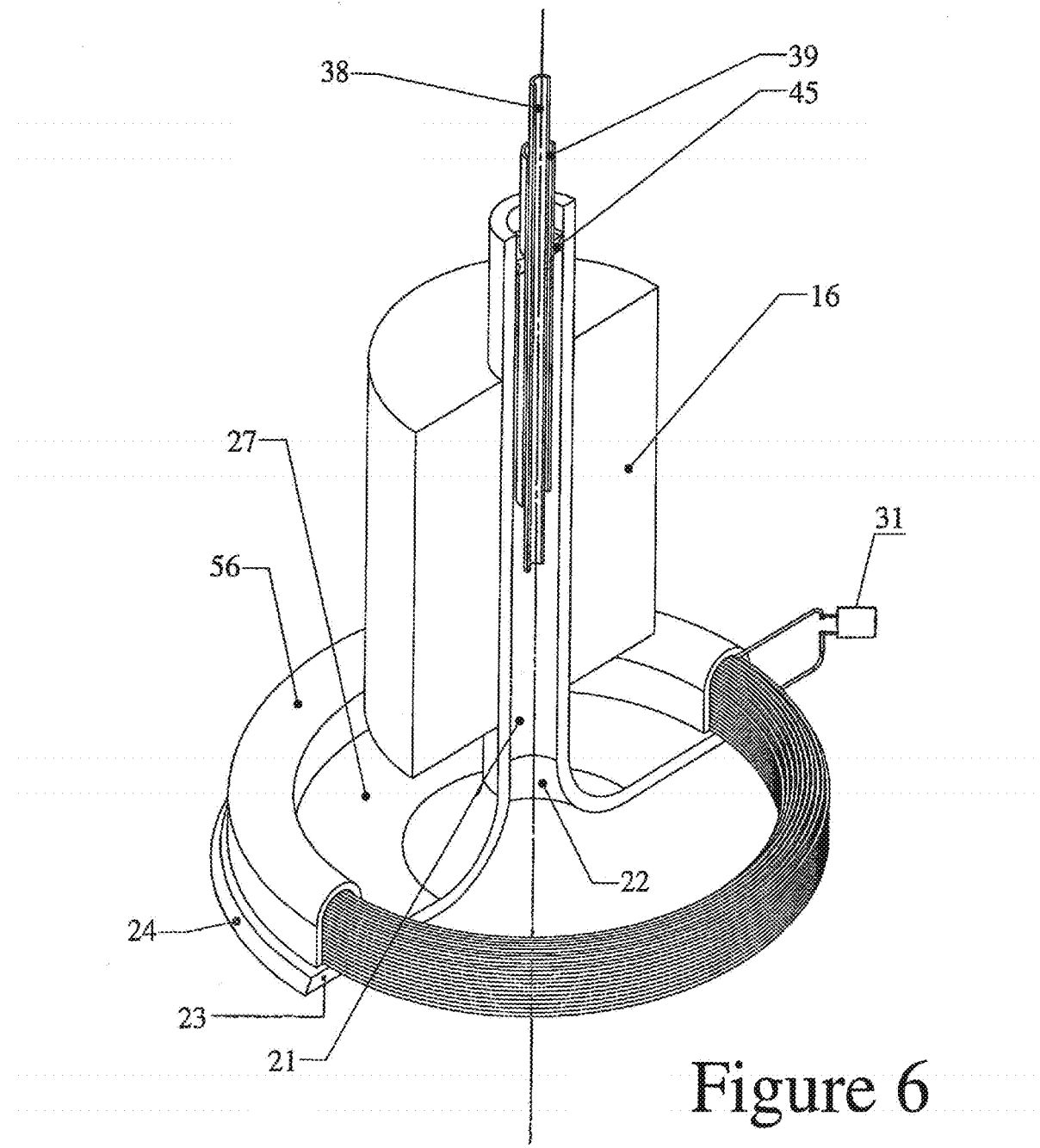

In the example represented in FIG. 6, the stimulus means are inductive. Disc 11 forms an electromagnetic armature for a fixed solenoid 56 placed around axis 13 turned towards face 27 of disc 11. There is no longer a revolving contact. The two ends of the solenoid are connected at the two terminals of inverter 31.

Figure 7:
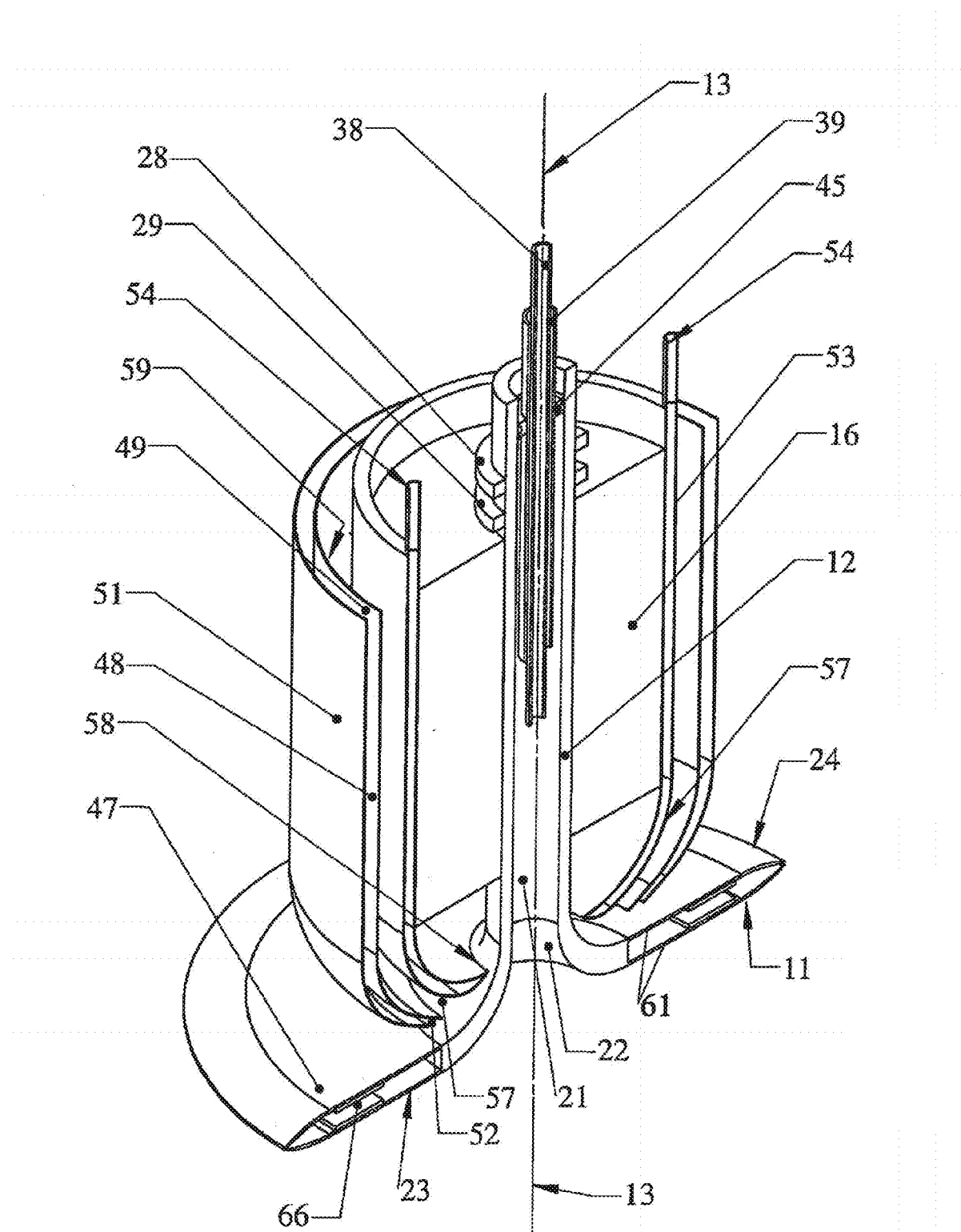

The vibro-rotary disc of the pulverisation head represented in FIG. 7 comprises one second ejection face 47 facing the motor 16. The second surface 47 is fed in substance to be pulverised by an annular, non-rotating conduit 48, which surrounds the motor 16. The annular conduit 48 is formed between two coaxial cylindrical walls 49, 51. In the area located axially between the motor 16 and the ejection face 47, the two walls 49, 51 converge in the direction of axis 13 to form an annular opening 50 delivering the substance to be pulverised to the connection zone between the outside of shaft 12 and the ejection face 47. In a way not represented, a proportioning pump sends the substance to be pulverised by centrifugation on face 47 into the annular conduit 48.

The substances to be pulverised are frequently heated to reduce their viscosity. Moreover, the two walls 49, 51 form a thermal barrier which tends to prevent evacuation of the heat produced by the motor 16. For these two reasons, the presence of the annular conduit 48 around the motor 16 can harm the cooling of the motor 16. To improve this, the motor 16 is assembled in a hollow jacket 53 in which circulates a liquid coolant. The liquid arrives in the jacket 53 and leaves the jacket 53 by connections 54. At the end toward disc 11, the jacket 53 forms a dome 57 which covers the corresponding end of the motor 16. The dome 57 comprises a central opening 58 crossed by the tubular shaft 12 with a certain clearance. The jacket 53 can for example be installed around the casing 17 represented in FIG. 2, or be made up by the casing 17 itself, which would then be provided with internal passages for the liquid coolant. An air gap 59 is spared between the annular conduit 48 and the hollow jacket 53, located radially inside conduit 48.

According to another characteristic of the embodiment of FIG. 7, the vibro-rotary disc 11 is hollow. It is composed of two plates 61, each of which carries one of the ejection surfaces 23 or 47 respectively on its outside face. On its interior face, each plate 61 carries piezoelectric cells 66. The plates 61 extend in parallel between them and perpendicular to the general axis 13 at a certain distance starting from the opening 22, then converge symmetrically one towards the other to meet at the ejection edge 24, which is thus common to both ejection faces.

Under operation, the substances which are conveyed respectively for one or the other of the two ejection faces 23, 47 mix when they cross the ejection edge 24.

Figure 8:
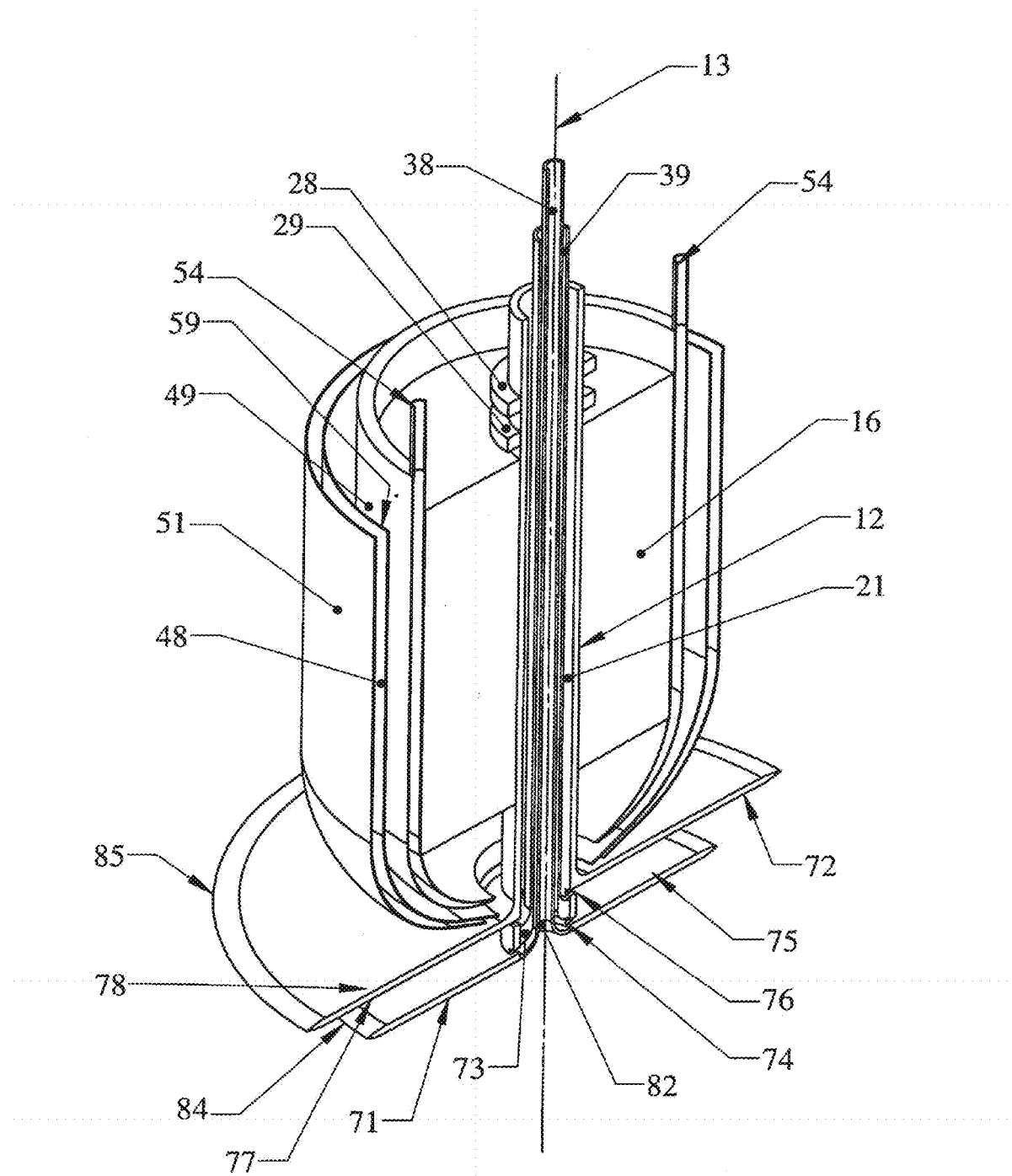

The embodiment of FIG. 8 will be described only for its differences compared to that of FIG. 7.

There are now two vibro-rotary discs 71, 72 having as their shared center the general axis 13, and which are both integrally linked to the hollow shaft 12. The discs are represented full but they could be made hollow, as in FIG. 7, each containing piezoelectric cells. Each disc carries two ejection faces. Instead of emerging in the interior space 21, conduit 38 is connected in a continuous way with the distal disc 71, furthest away from the motor 16, and emerges through disc 71 by an opening 82 and thus conveys material for the ejection face of the disc 71 which rotates in the opposite way to the motor 16. The conduit 39 which surrounds conduit 38 also extends to the area of discs 71, 72, where it forms a flange 73 forming a spacer between the two discs. This flange links the further disc 71 with the nearer disc 72, which is itself integrally linked to the hollow shaft 12. Moreover, the flange is hollow to define openings 74, 76 distributed angularly around the axis 13. The annular space between conduits 38 and 39 leads by openings 74 to the ejection face 75 of the further disc 71, which faces the other disc 72 and the motor 16. The annular space between conduit 39 and the interior face of shaft 12 leads by openings 76 to the ejection face 77 of the nearer disc 72, which faces the other disc 71 and away from the motor 16. In a way not represented, a third proportioning pump and a third swivel joint convey material to be pulverised in the annular space between conduit 39 and the interior face of shaft 12. Lastly, the annular conduit 48 feeds the ejection face 78 of the nearer disc 72 which faces the motor 16.

Under operation, the two substances feeding the two ejection faces of each disc mix when they arrive at the shared ejection edge 84 or 85 of that disc. The aerosol obtained typically comprises a mixture of droplets resulting from the nearer disc and droplets resulting from the further disc. This embodiment is useful to produce a great quantity of droplets of the same nature if the discs are fed with identical substances, or of two different natures if otherwise. One can regulate or choose the production and/or functional parameters relating to each disc and the associated substances so that the mixture of substances is in a determined ratio in the aerosol.

Even if the discs are fed with the same substances, one can make each disc produce droplets of a different size by choosing different parameters for the two discs. FIG. 8 illustrates this by representing the two discs with different diameters.

Figure 9:
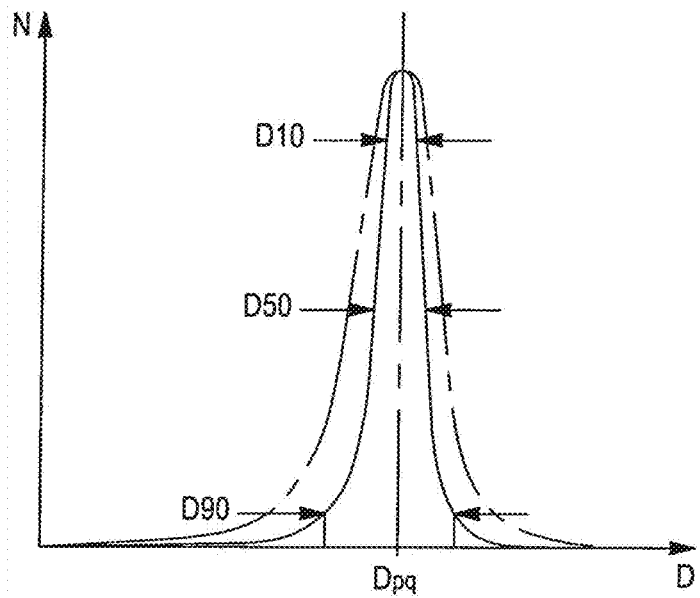
FIG. 9 is a graph representing a monodisperse distribution (in continuous feature), and a controlled polydisperse distribution (in discontinuous feature)

FIG. 9 is a statistical graph representing, for a sample of aerosol, the number N of aerosol particles according to the diameter D of the particles. Two Gaussian distributions are represented.

The distribution in full feature is known as "monodisperse". Almost all the particles have a diameter very close to the central value $D_{pq}$ which is at the same time the value for which one finds the greatest number of particles.

The distribution in mixed feature is known as "controlled polydisperse". It resembles the previous distribution, but the diameter values are less well gathered close to the central value $D_{pq}$.

The expert defines a parameter called "span" which characterizes a distribution such as those represented in FIG. 9, or more generally a Gaussian distribution. We have the relation:

$$\text{Span}=(D_{90}-D_{10})/D_{50}$$

In which:

$D_{90}$ is the interval of values (diameters) in which one finds 90% of the particles by volume closest to the central value, $D_{10}$ is the interval of values (diameters) in which one finds 10% of the particles by volume closest to the central value, and $D_{50}$ is the interval of values (diameters) in which one finds 50% of the particles by volume closest to the central value.

In FIG. 9, these parameters are illustrated in the case of the monodisperse distribution. Calculation shows that the span is substantially equal to 2.5 times the standard deviation in volume:

$$\text{Span} \approx 2.5\alpha_v$$

There also exists the following relation between the span and the standard deviation in volume $\sigma_v$:

$$\text{Span} \approx (2.5\sigma_v)/D_{50}$$

The more uniform the particle size, the lower the span value.

Within the framework of the invention, particle size is considered monodisperse when the span lies between 0.12 and 0.25. Particle size is considered controlled polydisperse when the span lies between 0.25 and 1.0. These values are very strict because the performances offered by the pulverisation method according to the invention are much higher than those permitted by current known methods. The best known methods claim obtaining monodisperse particle sizes for spans which are generally not lower than 1.0.

Figure 10:
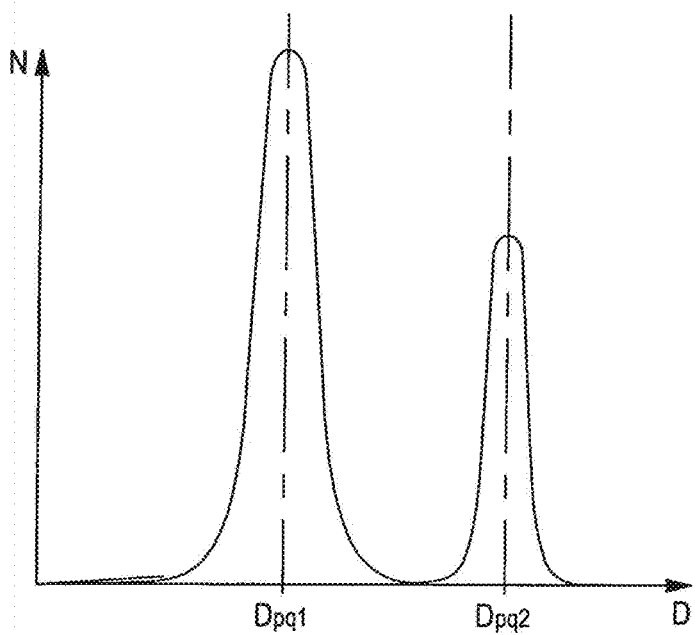
FIG. 10 is a graph representing a pluridisperse distribution.

FIG. 10 illustrates a pluridisperse distribution. There are two (or more) central values $D_{pq1}$ and $D_{pq2}$, and two monodisperse or controlled polydisperse distributions, each one associated with the one of the central values.

Figure 11:
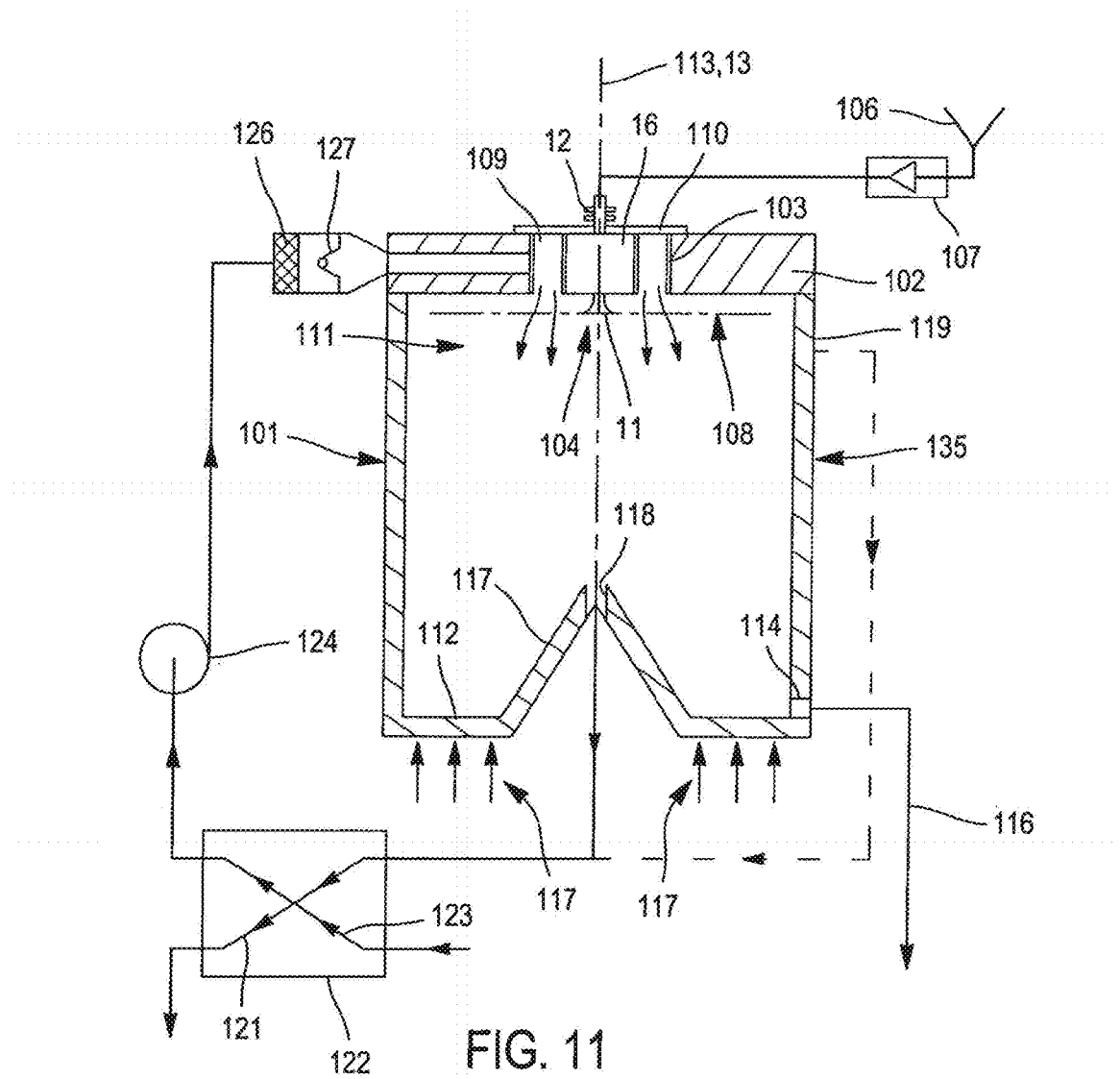
FIG. 11 is a schematic view in axial cut, of an apparatus according to the invention for the manufacture of a product in powder form.

FIG. 11 schematically represents an apparatus of manufacture of a product in powder form. The apparatus includes a tower 135 delimited by an enclosure 101 having a vertical axis 113. The top of enclosure 101 is enclosed by a wall 102. Wall 102 comprises an axial housing 103 in which a pulverisation head 104 is installed, which can be manufactured according to one of the embodiments of FIGS. 1 to 8. The general axis 13 of the head 104 coincides with axis 113 of enclosure 101 and more generally of the tower 135.

The supply of material to be pulverised to the head 104 is schematized by a tank 106 followed by a proportioning pump 107. The vibro-rotary disc 11 of the head 104 is in the interior space of the enclosure. The ejection surface of disc 11 defines a plan 108 of centrifugal droplet ejection. This plane extends perpendicular to axis 13, 113 at a certain distance below the higher wall 102.

The head 104 is surrounded by an air distributor 109, of known type, which produces all around the head 104, towards the interior of enclosure 101, a flow of air 111, of general tubular form. The treatment flow 111 meets the ejection plane 108 in the droplet formation zone and thus draws the droplets downwards away from the plane 108.

In this example, it is a flow of hot air which dries the droplets which then come to accumulate on the bottom 112 of the enclosure, from where they are recovered through an opening 114 and means of evacuation 116. Arrows 117 illustrate that the bottom of the enclosure can comprise means for a secondary injection of air producing a fluidised bed for the particles coming to gather on the bottom 112.

In the example represented, the tower is of W-bottomed type. This means that the bottom 112 presents along axis 113 a conical dome 117 pointing towards the interior of the enclosure and whose top consists of an opening 118 of evacuation of used, i.e. moist, air generated by the drying of the particles. At least one other air exit 119 can also be envisaged in the upper area of the side wall of the enclosure. Thanks to the invention, the used air contains virtually no fine particles. It is therefore not necessary to pass the used air through a dust removal or separation system. On the contrary, according to a characteristic of the invention, this used air is sent directly to the first stage 121 from a heat exchanger 122, preferably without even passing through a filter. The second stage 123 of the heat exchanger 122 is crossed by new air intended to feed the distributor 109. At the exit of the second stage 123, the new air is propelled by a fan 124, passes through a filter 126 and then a heater 127.

In the heat exchanger 122, the used air yields its heat to the new air 123. Thus, the heater 127 need only provide a little heat to regulate the temperature of the airflow 111.

Figure 12:
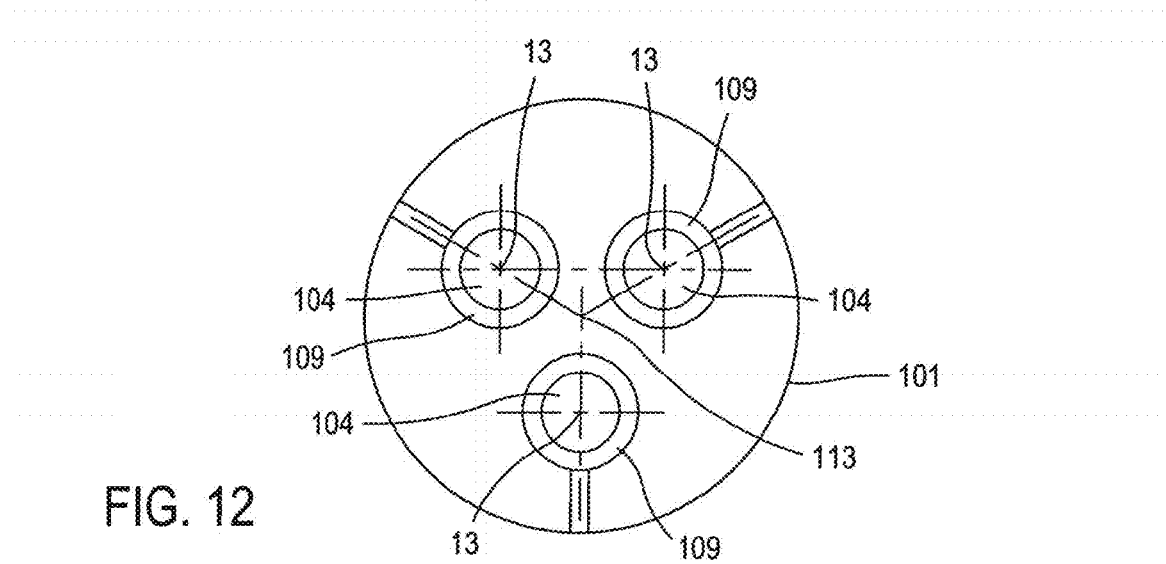
FIG. 12 is a schematic view from the top showing an apparatus according to the invention with several heads.

As shown in FIG. 12, in an enclosure 101 of greater dimensions, one can envisage several pulverisation heads 104 laid out symmetrically around axis 113. Each head 104 has its own distributor 109. In the example there are three heads 104 laid out in a triangle, at equal angular intervals (120°) around axis 113. Of course, in this case, axes 13 of the heads 104 no longer coincide with the general axis 113 of the enclosure.

Figure 13:
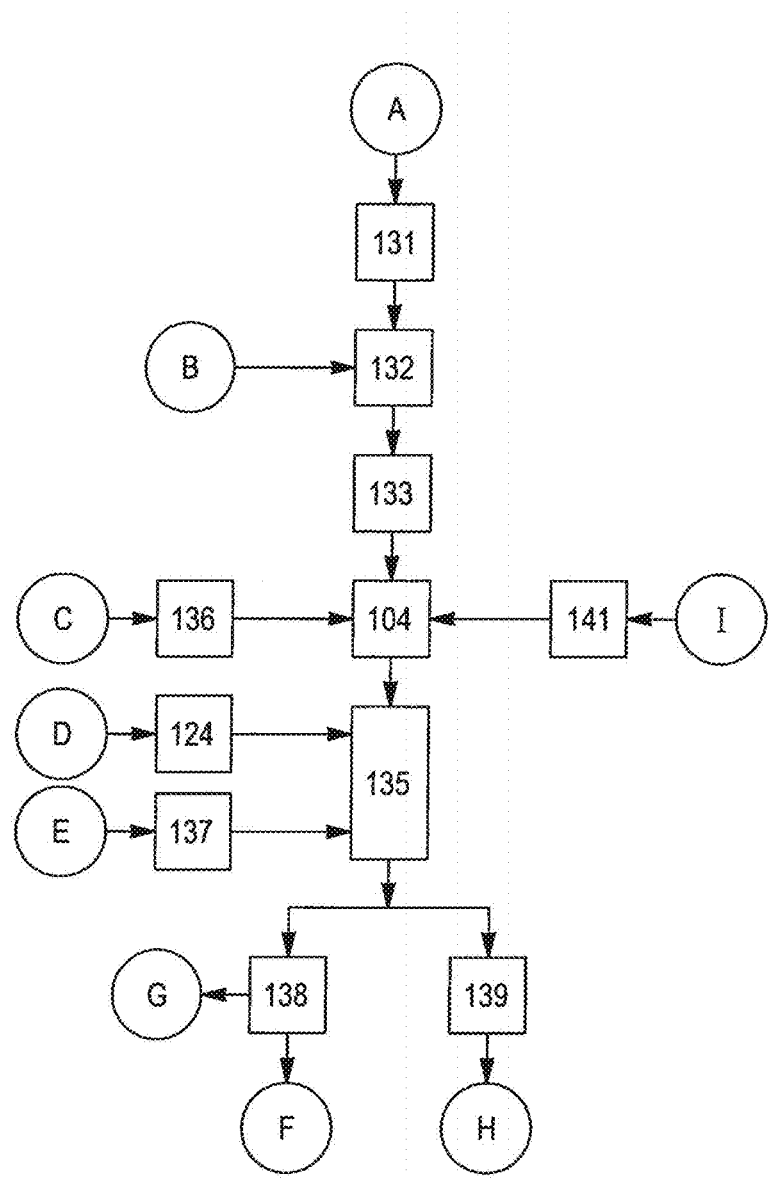
FIG. 13 is a conceptual diagram of an apparatus according to invention.

FIG. 13 is a general principle diagram of the invention's method. An initial liquid composition of microencapsulation, symbolized by the circle A, crosses a heater 131 before reaching a stage of dissolution or dispersion 132 where an active substance or a mixture of active substances to be microencapsulated is also introduced, symbolized by the circle B. At stage 132, the mixture of active substances to be microencapsulated is dissolved or dispersed homogeneously in the initial liquid composition, in order to obtain a composition in liquid form containing at least one active substance or a mixture of active substances to be micro-encapsulated. A pump 133 feeds the aforementioned composition with the active ingredients in the atomisation or spray-cooling tower 135 via the pulverisation head 104 intended for the production of monodisperse or controlled polydisperse aerosols. The circle C represents the possible addition of a substance or a mixture of active substances to be micro-encapsulated via a powder batcher 136 directly into the center of the disc, either by a hollow shaft such as 12 of FIGS. 1 to 8, or by an open injection cone, such as the annular conduit 48 of FIGS. 7 and 8, for discs with solid shaft or whose hollow shaft is used to inject other substances.

The circle D represents the introduction of the carrier gas, which can be cold for the solidification of the aerosol in the spray-cooling version or hot in the version for drying by atomisation, via the ventilator 124.

The circle E represents the introduction of the secondary carrier gas, for the drying and/or final cooling of the stabilized final composition obtained, solid or in the course of solidification via a ventilator 137.

A cyclone 138 separates all or part of the finished product F, i.e. the composition in powder form, which is recovered, and the carrier gas G that is evacuated.

An external fluidized vibrating bed 139 can also be envisaged, which would allow the recovery of all or part of the finished product H, i.e. the composition in powder form, by the bottom of the tower.

One could even envisage a powder batcher 141 to add in the pulverisation zone a solid substance in powder form I intended to stabilize the final solid composition. In reference to FIG. 11, such a powder injection can be done through plate 110 and the ceiling of distributor 109, in a way distributed around axis 113. One can also, in a manner known per se, envisage two concentric distributors around the pulverisation head 104, one for a main air column as represented, the other for an auxiliary air column to be used as a carrier for the powder and which can be at a different temperature, more suitable for the powder.

Figure 14:
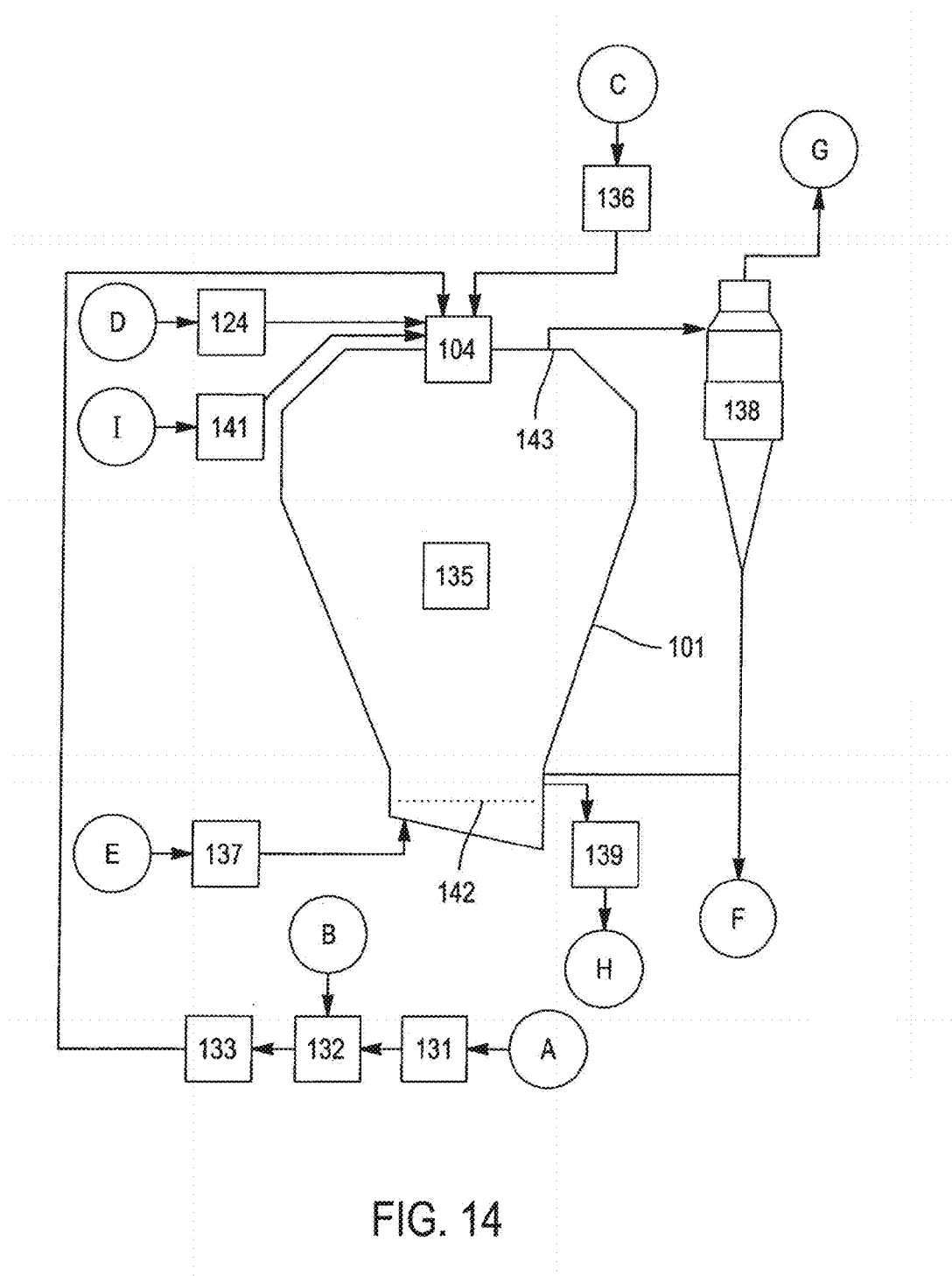
FIGS. 14 to 16 are diagrams representing three embodiments of the apparatus.

FIG. 14 is a general diagram of the invention's method, implemented in a multi-purpose tower. The circles A, B, C, D, E, F, G, H and I, as well as rectangles 104, 124, 131 to 133, 135 to 141 have the meanings indicated in connection with FIG. 13. The introduction of the secondary air E takes place through a permeable base 142 of the tower 135 to put the matter in powder form in the form of a fluidised bed. The used air is evacuated by an opening 143 through the higher wall of enclosure 101. In this example, the used air passes then through the cyclone 138 which produces on one hand the particles of product F and on the other the air to be evacuated G. The majority of the particles is collected just above the permeable wall 142. FIG. 14 illustrates that the particles are collected either directly in F, or via the external fluidised bed 139 in H where this is present.

Figure 15:
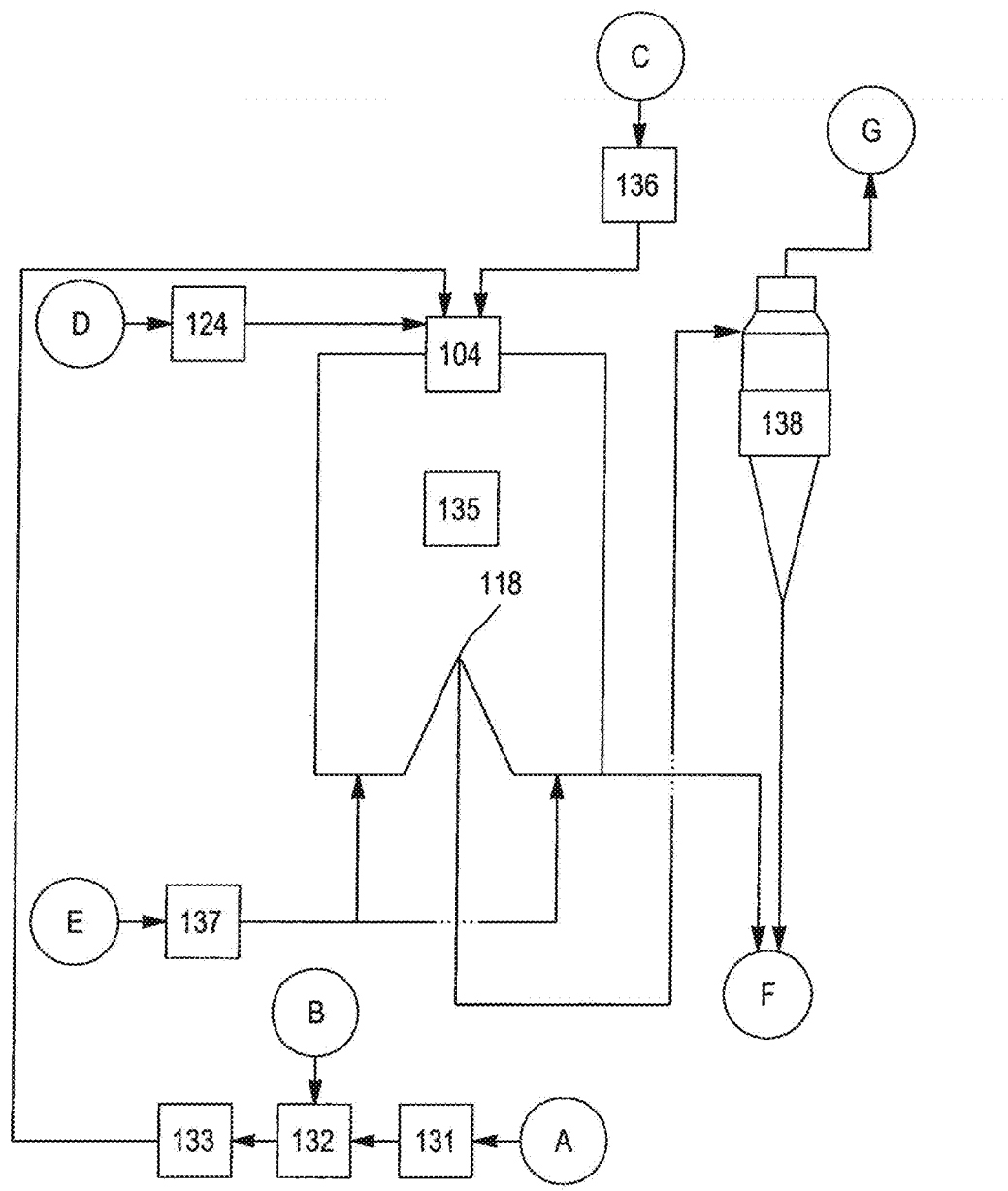

FIG. 15 is a general diagram of the invention's method, implemented in a tower with a so-called "W-bottom". The circles A, B, C, D, E, F and G, as well as rectangles 104, 124, 131 to 133 and 135 to 138 have the meanings indicated in reference to FIG. 13. This embodiment is simpler than that of FIG. 15 because it does not comprise either an external fluidised bed 139 or a powder batcher 141. It is different to that of FIG. 12 in that the outlet 118 for the used air is connected to the cyclone 138 which produces, as in FIG. 14, on one hand the air to be evacuated G, and on the other hand part of the useful product F. Always as in the example of FIG. 14, the remainder of the useful product F comes directly from the bottom of tower 135, installed on a fluidised bed.

Figure 16:
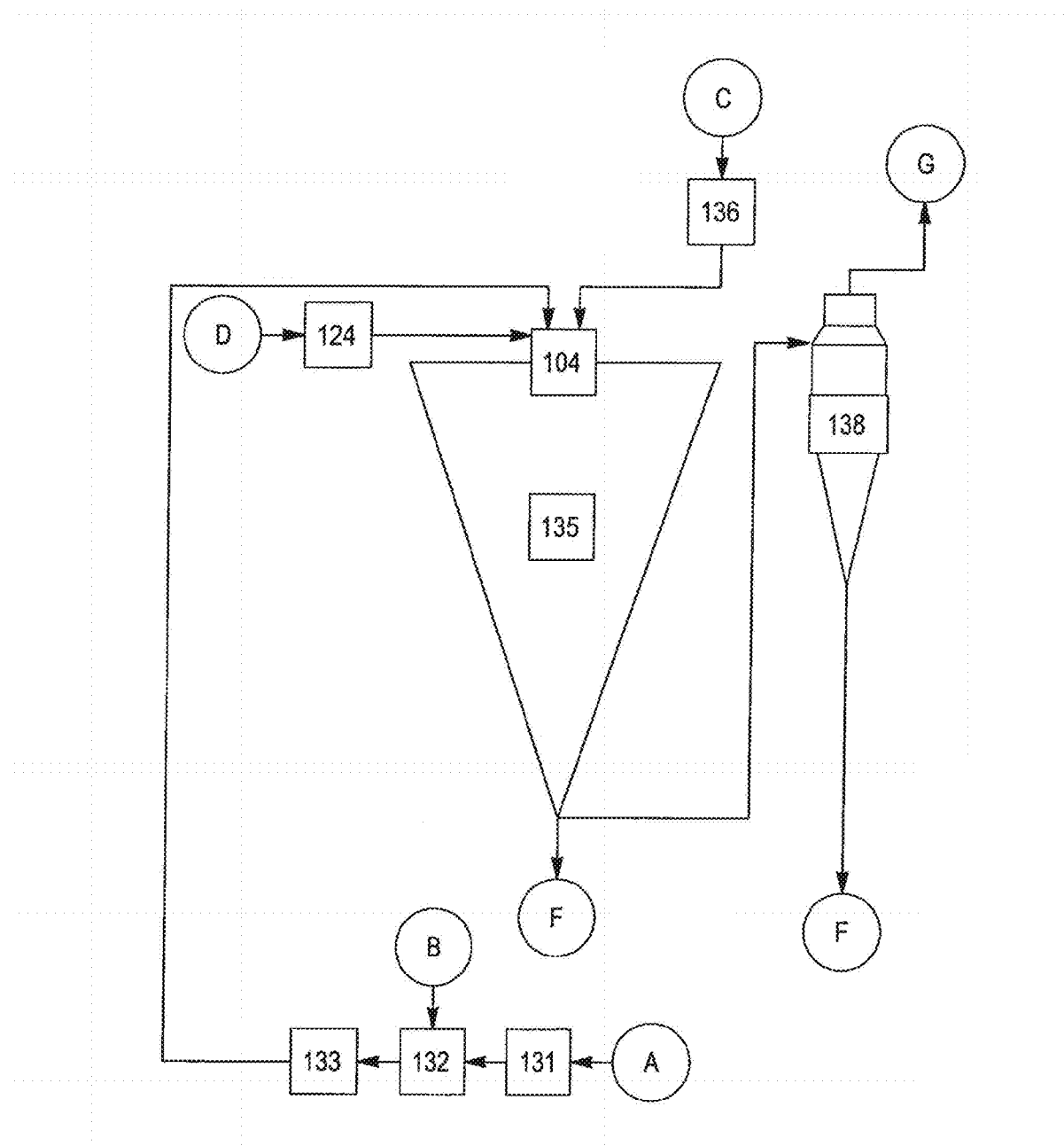

FIG. 16 is a general diagram of the invention's method, implemented in a single-effect tower. The circles A, B, C, D, F and G, as well as rectangles 104, 124, 131 to 133, 135, 136 and 138 have the meanings indicated in reference to FIG. 13. There is no longer a fluidised bed nor a secondary injection of air through the bottom of tower 135. A mixture of used air and particles is extracted through this pointed base. This mixture is then separated in the cyclone 138.

Figure 17:
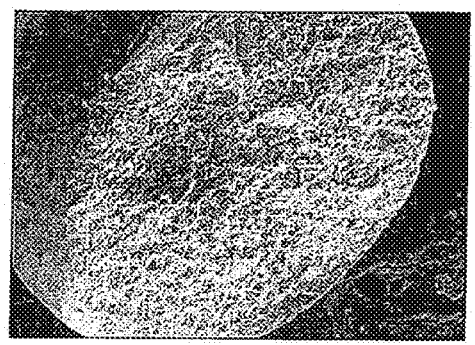
FIGS. 17 to 20 are photographs of particles obtained thanks to the invention, caught under the electronic microscope.

FIG. 17 is an image taken by scanning electron microscope of a particle obtained using to the invention, and which was broken substantially in a diametric plane. The particle was obtained by solidification of a greasy substance with a melting point of 60° C. The particle is perfectly spherical and dense, its diameter is approximately 500 μm.

Figure 18:
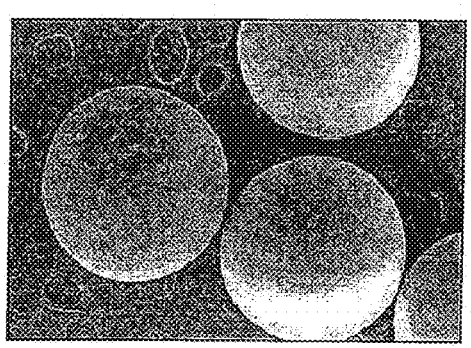

FIG. 18 represents several particles of the same product as FIG. 17. The span is of 0.25.

Figure 19:
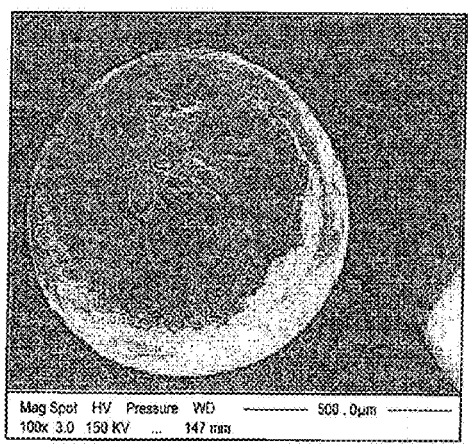
Figure 20:
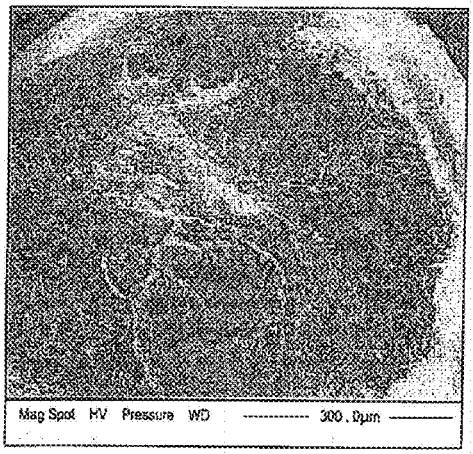

FIGS. 19 and 20 represent with two different magnifications a particle with a diameter of approximately 500 μm made up of extended crystals riboflavin micro-encapsulated in the fatty material of FIGS. 17 and 18. The length of the extended crystals is between 5 and 10 μm. Even at that scale, the particles are almost perfect spheres.

The invention claimed is:

1. A method for pulverising at least one substance, comprising:
rotating a rotary body about an axis of rotation along a central area of the rotary body, the rotary body having at least one ejection surface ending in a peripheral ejection edge, the at least one ejection surface extending in a radial direction from the central area;
feeding at least one substance onto the at least one ejection surface during rotation of the rotary body; and
applying a stimulus to the rotary body in an area of the at least one ejection surface to provide a sustained vibration in the rotary body at an area of the ejection edge,
wherein, the vibration is generated from the area of the at least one ejection surface at which the stimulus is applied to make the area of the ejection edge oscillate relative to the central area of the rotary body, and
wherein, the stimulus is generated from piezoelectric cells fixed at the rotary body in the area of the at least one ejection surface.

2. The method according to claim 1, wherein the vibration is maintained with a frequency sufficiently close to the sympathetic vibration frequency of mode of deformation of the rotary body such that vibratory deformation occurs at the area of the ejection edge.

3. The method according to claim 1, wherein the at least one substance to be pulverised is a mixture of at least two constituents.

4. The method according to claim 3, wherein the constituents include at least one powder made up of particles and one liquid to form droplets, each of said droplets is made up of a powder particle associated with a quantity of the liquid.

5. The method according to claim 4, wherein the powder and the liquid mix or react with one another to form substantially homogeneous aerosol droplets.

6. The method according to claim 4, wherein the powder and the liquid remain substantially separate to form aerosol droplets, each droplet being made up of a powder particle coated with the constituent which is fed in liquid form.

7. The method according to claim 4, wherein applying the stimulus to the rotary body in an area of the at least one ejection surface provides a vibration frequency that produces droplets with a size that corresponds to that of the powder particles.

8. Method according to claim 1, characterized in that one ejection surface includes two ejection surfaces (23, 47) having a common ejection edge (24).

9. Method according to claim 1, characterized in that at least one ejection surface includes two ejection surfaces, each one with its own ejection edge (84, 85).

10. Method according to claim 9, characterized in that a parameter of operation is differently regulated for the two surfaces, so that the droplets produced by each of two surfaces have respective different particle sizes.

11. Method according to claim 8, characterized in that at least one substance includes two substances that are each brought to one ejection surface and which form an aerosol mixed radially beyond the ejection surfaces.

12. Method according to claim 8, characterized in that one feeds two surfaces with the same substance.

13. The method according to claim 1, further comprising subjecting the area of the ejection edge to a treatment gas flow to provide an aerosol formation area for producing aerosol droplets.

14. The method according to claim 13, wherein the treatment gas flow includes a flow that is counter-current relative to the droplets moving generally in an axial direction once centrifugal kinetic energy of the droplets generated by the rotation is dissipated.

15. The method according to claim 13, wherein the treatment gas flow includes a flow of tubular form substantially coaxial with an axis of the rotary body, so that said flow radially meets an area of droplet formation beyond the ejection edge and draws the droplets axially.

16. The method according to claim 13, wherein the treatment gas flow is a droplet solidification flow.

17. The method according to claim 13, wherein,
the at least one substance includes at least one constituent that is at risk of degradation or destruction under the effect of excessive temperature and/or excessively long heating selected from the group consisting of a aromatic constituent, a pharmaceutical constituent, a food constituent, a pre-biotic constituent, and a pro-biotic constituent, and
the method produces a powder containing said at risk of degradation or destruction under the effect of excessive temperature and/or excessively long heating.

18. The method according to claim 13, wherein before subjecting the area of the ejection edge to the treatment gas flow, the treatment gas flow passes through a heat exchanger that exchanges heat energy to the treatment gas flow with treatment gas flow having already been used to produce aerosol droplets.

19. The method according to claim 14, wherein a part at least of treatment gas flow having already been used to produce the aerosol droplets passes through no filtration system between an opening of evacuation of the interaction zone with the aerosol and the heat exchanger.

20. The method according to claim 13, wherein the method produces solid particles made up of at least one active substance coated in a micro-encapsulation substance.

21. The method according to claim 20, wherein the microencapsulation substance is film-forming.

22. The method according to claim 20, wherein the microencapsulation substance is a matrix in which at least one active substance is coated.

23. The method according to claim 13, wherein a hot gas is used for the treatment gas flow to transform the aerosol droplets into solid particles by drying.

24. The method according to claim 13, wherein the area around the ejection edge is subjected to the treatment gas flow having a lower temperature than that of the aerosol droplets to transform the aerosol droplets into solid particles by freezing.

25. The method according to claim 24, wherein the ejection surface is fed with a substance including a lipidic matter with a high melting point in which at least one active ingredient is integrated.

26. The method according to claim 25, wherein the at least one active ingredient includes solids of nanometric scale.

27. The method according to claim 25, wherein the at least one active ingredient includes at least one essential oil.

28. The method according to claim 13, wherein the method forms monodisperse or controlled polydisperse spheres one or more potents of heterogeneous nonspherical forms and with polydisperse particle size.

29. The method according to claim 28, further comprising subjecting the spheres obtained to a microencapsulation stage.

30. The method according to claim 13, wherein droplets having at least two different sizes are produced on at least two ejection surfaces to obtain a powder made up of a mixture of particles of at least two different sizes.

31. The method according to claim 1, wherein the at least one substance is delivered to the at least one ejection surface through at least one conduit formed axially in a hollow shaft of a drive motor connected to the rotary body.

32. The method according to claim 31, wherein different conduits separately lead to different faces of the rotary body.

33. The method according to claim 31, wherein at least one conduit crosses the rotary body to emerge by an opening in an ejection surface oriented in a direction primarily opposed to the drive motor.

34. The method according to claim 31, wherein at least one conduit leads by means of a radial passage to an ejection surface primarily directed towards the drive motor.

35. The method according to claim 31, wherein the rotary body includes at least two elementary bodies following one another along the axis, and in that at least one conduit emerges through a radial passage between the two elementary bodies.

36. The method according to claim 31, wherein the motor is axially placed between the rotary body and the connection area of the conduit with a source of substance.

37. The method according to claim 1, wherein the at least one substance is delivered to the at least one ejection surface through an annular conduit formed around a drive motor connected to the rotary body and emerging by an annular slit around a junction between a drive shaft of the rotary body and the ejection surface.

* * * * *